(12) United States Patent
Aiba et al.

(10) Patent No.: US 8,315,130 B2
(45) Date of Patent: Nov. 20, 2012

(54) OBJECTIVE LENS, OPTICAL PICKUP AND OPTICAL DISC APPARATUS

(75) Inventors: Motoo Aiba, Tokyo (JP); Kouhei Anju, Tokyo (JP)

(73) Assignee: Sony Corporation, Tokyo (JP)

( * ) Notice: Subject to any disclaimer, the term of this patent is extended or adjusted under 35 U.S.C. 154(b) by 70 days.

(21) Appl. No.: 12/917,580

(22) Filed: Nov. 2, 2010

(65) Prior Publication Data

US 2011/0110217 A1    May 12, 2011

(30) Foreign Application Priority Data

Nov. 9, 2009   (JP) ................... 2009-256316

(51) Int. Cl.
*G11B 7/00*   (2006.01)
(52) U.S. Cl. .................................. 369/44.21
(58) Field of Classification Search .............. None
See application file for complete search history.

(56) References Cited

U.S. PATENT DOCUMENTS 7,848,211 B2 * 12/2010 Yamamoto et al. ...... 369/112.23
8,116,188 B2 *  2/2012 Yasui ....................... 369/112.23

FOREIGN PATENT DOCUMENTS

JP        2005-327396 A    11/2005

* cited by examiner

*Primary Examiner* — Joseph Feild
*Assistant Examiner* — Parul Gupta
(74) *Attorney, Agent, or Firm* — Wolf, Greenfield & Sacks, P.C.

(57) ABSTRACT

An objective lens is made of a resin material and focuses incident rays, which have a wavelength of 410 nm or less and are emitted from a light source, on an optical disc at a numerical aperture of 0.8 or more, wherein when a lens tilt sensitivity is defined as an amount of a 3rd-order coma aberration caused per a lens tilt of 1 degree which is an angle formed between an optical axis of the objective lens and a system optical axis of an optical system including the objective lens at 0° C., the lens tilt sensitivity is 130 mλrms/degree or less.

14 Claims, 12 Drawing Sheets

OBJECTIVE LENS, OPTICAL PICKUP AND OPTICAL DISC APPARATUS

CROSS REFERENCE TO RELATED APPLICATIONS

This application claims priority under 35 U.S.C. § 119 to Japanese Priority Patent Application JP 2009-256316 filed in the Japan Patent Office on Nov. 9, 2009, the entire content of which is hereby incorporated by reference.

BACKGROUND OF THE INVENTION

1. Field of the Invention

The present invention relates to an objective lens, an optical pickup and, an optical disc apparatus, and can be appropriately applied to, for example, an optical disc apparatus that records information on an optical disc and reproduces information from the corresponding optical disc.

2. Description of the Related Art

Generally, optical disc apparatuses which record information on an optical disc such as a CD (Compact Disc) and a DVD (Digital Versatile Disc) and read the corresponding information from the corresponding optical disc have been widely used. In recent years, additionally, a Blu-ray Disc (registered trademark, hereinafter referred to as BD) in which a density of recording information on an optical disc is significantly increased has come into wide spread use.

The optical disc apparatuses are configured to focus a light beam onto a track spirally or concentrically formed on a recording layer of an optical disc through an objective lens and keep track of the focal point.

For example, in the case of the DVD format, the objective lens focuses a light beam with a wavelength of about 660 nm onto the recording layer which is formed below a cover layer having a thickness of about 0.6 mm in the optical disc at a numerical aperture (NA) of about 0.6 or more.

In contrast, in the case of the BD format, in order to minimize a diameter of a light spot on the information recording surface of the optical disc, it is necessary for the objective lens to focus a light beam with a wavelength of about 405 nm onto the recording layer which is formed below the cover layer having a thickness of about 0.1 mm in the optical disc at a numerical aperture (NA) of 0.8 or more.

In recent years, a resin material highly resistant to blue laser light has been developed. Thus, from the viewpoint of reduction in cost, weight, or the like, an objective lens made of the resin material instead of the typical glass material will be introduced even into the BD format.

However, the refractive index of the objective lens made of the resin material is greatly dependent on temperature in comparison with that of the objective lens made of the glass material, and thus the optical characteristics thereof tend to change in accordance with temperature changes. On the other hand, in view of a usage environment, inner temperature rise, or the like, a guaranteed operation temperature range of the objective lens mounted in the optical disc apparatus is supposed to be, for example, a range of 0 to 70° C.

For example, in the optical disc apparatus using the objective lens made of the resin material, at a reference temperature set to 35° C. which is at substantially the middle of the operable temperature range, a 3rd-order spherical aberration amount was designed and adjusted to be substantially equal to 0 mλrms. In the optical disc apparatus, as indicated by the characteristic curve QTS in FIG. 1, the 3rd-order spherical aberration exceeds 70 mλrms of the Marechal criterion on both the high temperature side and the low temperature side of the range of 0 to 70° C., and thus there is a concern that a problem may arise in signal quality.

In the optical disc apparatus, there has been proposed a method of correcting spherical aberration by adjusting a position of a collimator lens, which converges or diverges a light beam, along the optical axis so as to change the incident magnification of the light beam incident to the objective lens (for example, refer to JP-A-2005-327396, FIG. 2).

In addition, it is defined that the sign of the incident magnification is positive when divergent light is incident to the objective lens and the sign thereof is negative when convergent light is incident thereto.

In the optical disc apparatus, for example, as indicated by the characteristic curve QMS35 in FIG. 2, at the temperature of 35° C., when the incident magnification is set to 0, that is, when the light incident to the objective lens is parallel light, the 3rd-order spherical aberration amount is designed to become 0 mλrms.

On the other hand, at a temperature of 0° C., as indicated by the characteristic curve QMS0, the 3rd-order spherical aberration becomes about 140 mλrms in a state where the incident magnification is 0. However, it can be observed that it is possible to suppress the 3rd-order spherical aberration amount to approximately 0 mλrms in the case of convergent light by which the incident magnification of the objective lens is set to about −0.005.

As described above, it is possible to correct the 3rd-order spherical aberration depending on temperature change by adjusting the position of the collimator lens along the optical axis.

SUMMARY OF THE INVENTION

As it is, regarding the optical disc apparatus using the objective lens made of the resin material, it was found that there is a problem in that, even when the 3rd-order spherical aberration depending on temperature change can be corrected to 0, the occurrence amount of the coma aberration relative to the tilt of the objective lens at a low temperature increases. In the following description, in a state where a cover layer with a refractive index of 1.62 and a thickness of 87.5 μm is inserted, an occurrence amount of the 3rd-order coma aberration per a unit tilt of the objective lens is referred to as a lens tilt sensitivity.

For example, as indicated by the characteristic curve QTL in FIG. 3, in the objective lens made of the resin material, the lens tilt sensitivity increases in accordance with a decrease in temperature. In the range of 0 to 70° C. as the operable temperature range of the objective lens, the lens tilt sensitivity reaches a maximum at 0° C. Thus, it can be seen that relatively large coma aberration is caused by the slight tilt of the objective lens.

The increase in the lens tilt sensitivity at low temperature is greatly affected by moving the collimator lens so as to make the 3rd-order spherical aberration, which is caused by temperature change, to 0.

The lens tilt sensitivity generally has, as indicated by the characteristic curve QML35 and QML0 in FIG. 4, a larger value at the temperature of 0° C. rather than at the temperature of 35° C. For example, if the incident magnification of the objective lens is fixed at 0, the lens tilt sensitivity is about 100 mλrms/degree at 35° C., and increases up to about 110 mλrms/degree at 0° C.

Moreover, for example, when the temperature thereof changes from 35° C. to 0° C., considering that the incident magnification changes from 0 to about −0.005 so as to correct (cancel) the 3rd-order spherical aberration, the lens tilt sensitivity at 0° C. increases from about 110 mλrms/degree to about 140 mλrms/degree.

This means that the lens tilt sensitivity increases particularly at low temperature (for example 0° C.) even when the incident magnification is changed in accordance with temperature change in terms of the 3rd-order spherical aberration by designing the optical disc apparatus and performing the position adjustment or the like so as to minimize various aberrations at the reference temperature (35° C.)

In consideration of the above, in the optical pickup of the BD format using the objective lens made of the resin material, a tilt adjustment mechanism of adjusting a tilt of the objective lens with respect to the disc radial direction has been studied in order to cancel coma aberration, which is caused by deformation and the like of the optical disc, by coma aberration which is caused by the tilt of the objective lens.

In the tilt adjustment mechanism, there is a problem that the lens tilt sensitivity becomes low at high temperature and it is difficult to cancel the coma aberration even when the objective lens is tilted, and therefore various countermeasures have been studied. However, since the increase in the lens tilt sensitivity at low temperature does not disturb the canceling of the coma aberration, the increase has not been treated as a problem.

Incidentally, contrary to the method of adjusting the tilt of the objective lens in the optical pickup, a method of designing the objective lens so as to secure coma aberration on the basis of accuracy of assembly can be considered.

As it is, in the related art, nothing has been discovered regarding the desirable range of the lens tilt sensitivity at low temperature, and it was not apparent whether or not the objective lens designed by the method used in the related art can also be applied to the case where the tilt adjustment is not performed.

Until now, there is no established design method of making the lens tilt sensitivity at low temperature (for example 0° C.) equal to or less than a desired value at the time of design. Furthermore, the lens tilt sensitivity at a temperature different from the temperature on the design basis includes very complex calculation in which it may be necessary for the refractive index of the objective lens, the lens surface shape, and the like to be changed. Thus, there is a difficulty in effectively checking the sensitivity at the time of designing the objective lens.

For example, the typical objective lenses SP1 and SP2 based on the design of the related art have the dimensional values shown in Table 1. The light-source-side lens surfaces and the disc-side lens surfaces of the objective lenses SP1 and SP2 are formed as aspheric surfaces each of which is expressed by applying the respective coefficients (aspheric surface coefficients) of Table 1 to Expression (1) representing the distance ASP (R) from the tangent plane on the optical axis to the point which is located at the distance R from the optical axis. In addition, FIG. 5 shows the longitudinal aberration diagram of the objective lens SP1.

TABLE 1

| DIMENSIONAL VALUES OF TYPICAL OBJECTIVE LENS | | | |
|---|---|---|---|
| NUMBER | | SP1 | SP2 |
| FOCAL LENGTH f[mm] | | 1.412 | 1.412 |
| REFRACTIVE INDEX n | | 1.560 | 1.560 |
| TEMPERATURE REFRACTIVE INDEX GRADIENT dn/dT | | $-1.09 \times 10^{-4}$ | $-1.09 \times 10^{-4}$ |
| LIGHT-SOURCE-SIDE | RDY | 0.946957 | 0.945324 |

TABLE 1-continued

| DIMENSIONAL VALUES OF TYPICAL OBJECTIVE LENS | | | |
|---|---|---|---|
| NUMBER | | SP1 | SP2 |
| LENS SURFACE | K | −0.613851 | −0.606760 |
| | A | 0.026485 | 0.024091 |
| | B | −0.048548 | −0.045980 |
| | C | 0.338888 | 0.335288 |
| | D | −1.091601 | −1.090101 |
| | E | 2.099527 | 2.099527 |
| | F | −2.430514 | −2.430514 |
| | G | 1.670105 | 1.670105 |
| | H | −0.624328 | −0.624328 |
| | J | 0.097039 | 0.097039 |
| DISC-SIDE | RDY | −1.517203 | −1.525127 |
| LENS SURFACE | K | −43.071457 | −42.365171 |
| | A | 0.264211 | 0.270511 |
| | B | −0.170962 | −0.172607 |
| | C | −0.605596 | −0.610744 |
| | D | 0.692735 | 0.696489 |
| | E | 0.741653 | 0.741653 |
| | F | −0.979282 | −0.979282 |
| | G | −1.046755 | −1.046755 |
| | H | 1.866865 | 1.866865 |
| | J | −0.698326 | −0.698326 |
| 3RD-ORDER OFF-AXIS COMA ABERRATION SENSITIVITY x[mλrms/degree] | | −0.8 | −0.1 |
| 5TH-ORDER OFF-AXIS COMA ABERRATION SENSITIVITY y[mλrms/degree] | | 0.7 | 0.8 |
| LENS THICKNESS SENSITIVITY z[mλrms/μm] | | −0.1 | 0.6 |
| LIGHT-SOURCE-SIDE SAG AMOUNT w[mm] | | 1.039 | 1.044 |
| LENS TILT SENSITIVITY LT at 0° C. [mλrms/degree] | | 143.19 | 144.39 |
| APPROXIMATION BASED ON F(x, y, z) [mλrms/degree] | | 144.56 | 144.46 |
| APPROXIMATION BASED ON F(x, y, w) [mλrms/degree] | | 144.80 | 144.67 |

$$ASP(R) = \frac{\frac{R^2}{RDY}}{1 + \sqrt{1 - (1+K)\left(\frac{R}{RDY}\right)^2}} + AR^4 + BR^6 + CR^8 + DR^{10} + ER^{12} + FR^{14} + GR^{16} + HR^{18} + JR^{20} \quad A(1)$$

As shown in Table 1, the objective lenses SP1 and SP2 based on the design of the related art have a focal length f of 1.412 mm in common. In addition, the lenses are formed of a resin material of which the refractive index n is 1.560 and of which the temperature refractive index gradient dn/dT as a tilt obtained when the relationship between the temperature and the refractive index is linearly approximated is $-1.09 \times 10^{-4}$.

In addition, Table 1 shows the 3rd-order and 5th-order off-axis coma aberration sensitivities [mλrms/degree]. Here, the off-axis coma aberration sensitivities [mλrms/degree] are defined as occurrence amounts of coma aberration, which are caused outside the optical axis, per the angles of the light beams incident to the respective objective lenses at 35° C. in a state where the cover layer with a refractive index of 1.62 and a thickness of 87.5 μm is inserted.

Further, Table 1 also shows the respective 3rd-order lens thickness sensitivities [mλrms/μm]. Here, the lens thickness sensitivities [mλrms/μm] are defined as occurrence amounts of spherical aberration per amounts of increased lens center thicknesses of the respective objective lenses at 35° C.

In the past, it had been considered that the values of the off-axis coma aberration sensitivity and the lens thickness sensitivity are less likely to be affected by variations as the values are smaller (that is, the values are substantially close to 0).

As shown in Table 1, all the 3rd-order off-axis coma aberration sensitivities and the 5th-order off-axis coma aberration sensitivities of the typical objective lenses SP1 and SP2 are equal to or less than ±1 mλrms/degree. In addition, the 3rd-order lens thickness sensitivities thereof are also equal to or less than 1 mλrms/μm. Therefore, it would appear that the respective sensitivities are satisfactory.

However, as shown in Table 1, at low temperature, the lens tilt sensitivity of the objective lens SP1 is 143.19 mλrms/degree, and that of the objective lens SP2 is 144.39 mλrms/degree. All the sensitivities thereof are equal to values of around 144 mλrms/degree.

Here, in the objective lens used in the optical pickup using a method of securing coma aberration on the basis of the accuracy without using the tilt sensitivity of the objective lens, the lens tilt sensitivity at low temperature is high. This means that, for example, the slight tilt of the objective lens formed at the time of the assembly of the optical pickup is highly likely to have an effect of causing large coma aberration at low temperature.

That is, in the objective lens used in such an optical pickup, it is preferable to minimize the lens tilt sensitivity at low temperature. However, until now, the allowable limit value of the lens tilt sensitivity at low temperature had not been clarified.

Further, although the allowable limit value is clarified, a method of embodying the objective lens of which the lens tilt sensitivity at low temperature satisfies the allowable limit value had not yet been clarified.

As described above, in the objective lens in the case where the lens tilt sensitivity at low temperature is high, the occurrence amount of coma aberration relative to the incident angle error increases, and thus the optical characteristics thereof are deteriorated. In accordance therewith, in the optical pickup and the optical disc apparatus using the objective lens, there is a concern about deterioration in accuracy of recording and reproducing for the optical disc.

Thus, it is desirable to provide an objective lens, an optical pickup and an optical disc apparatus capable of suppressing deterioration in optical characteristics caused by temperature change.

According to an embodiment of the invention, there is provided an objective lens made of a resin material and focuses incident rays, which have a wavelength of 410 nm or less and are emitted from a light source, on an optical disc at a numerical aperture of 0.8 or more. When a lens tilt sensitivity is defined as an amount of a 3rd-order coma aberration caused per a lens tilt of 1 degree which is an angle formed between an optical axis of the objective lens and a system optical axis of an optical system including the objective lens at 0° C., the lens tilt sensitivity is 130 mλrms/degree or less.

The objective lens is to be used in the BD format which is configured to focus the incident rays with the wavelength of 410 nm or less onto the optical disc at the numerical aperture of 0.8 or more, in particular, to be used in an optical pickup using a method of securing the tilt angle of the objective lens on the basis of accuracy of assembly thereof without adjusting the tilt angle of the objective lens.

Specifically, the objective lens is to suppress the deterioration in the 3rd-order coma aberration at low temperature within a range in which no problem arises in practice by designing to make the lens tilt sensitivity at the low temperature of, for example, 0° C. be within the predetermined range.

With such a configuration, even when the corresponding objective lens is tilted with respect to the optical disc, by minimizing the occurrence amount of coma aberration, it is possible to prevent the recording and reproducing characteristics from being deteriorated in the BD format.

The objective lens according to the embodiment of the invention may be configured such that a focal length f of the objective lens is 1.412 mm, the refractive index n of the resin material is 1.560, the refractive index gradient dn/dT of the resin material relative to the temperature thereof is $-1.09 \times 10^4$, and, assuming that 3rd-order and 5th-order coma aberrations caused when the optical axis of the rays incident to the objective lens is tilted by 1 degree with respect to the system optical axis at 35° C. are respectively a 3rd-order off-axis coma aberration sensitivity x [mλrms/degree] and a 5th-order off-axis coma aberration sensitivity y [mλrms/degree], and an amount of a 3rd-order spherical aberration caused when a lens thickness as a space between lens centers of both surfaces of the objective lens increases by 1 μm from a designed value is a lens thickness sensitivity z [mλrms/μm], the 3rd-order off-axis coma aberration sensitivity x, the 5th-order off-axis coma aberration sensitivity y, and the lens thickness sensitivity z are respectively determined so that a function $F(x, y, z)$ represented by the following Expression (2) is equal to 130 or less.

$$F(x,y,z) = -1.05x - 0.27y + 1.03z + 144.0 \qquad (2)$$

In the objective lens, as represented by Expression (2), the following fact is used: a linear relation is established between the lens tilt sensitivity at 0° C. and each of the 3rd-order off-axis coma aberration sensitivity x, the 5th-order off-axis coma aberration sensitivity y, and the lens thickness sensitivity z at 35° C. which is at the middle of the temperature range for use of the objective lens and is the basis of the lens design.

Incidentally, in the design of the objective lens, the 3rd-order off-axis coma aberration sensitivity x, the 5th-order off-axis coma aberration sensitivity y, and the lens thickness sensitivity z are parameters which are frequently used.

That is, in the objective lens according to the embodiment of the invention, among a large number of parameters, the frequently used 3rd-order off-axis coma aberration sensitivity x, 5th-order off-axis coma aberration sensitivity y, and lens thickness sensitivity z at 35° C. are appropriately set to satisfy Expression (2). In such a manner, it is possible to suppress the lens tilt sensitivity at 0° C. to 130 mλrms/degree or less. Thus, it is possible to prevent the recording and reproducing characteristics from being deteriorated in the BD format.

As described above, in the embodiment of the invention, it is revealed that the lens tilt sensitivity of the objective lens at 0° C. can be predicted or can be approximated with a sufficient accuracy on the basis of Expression (2) using the three parameters of the 3rd-order off-axis coma aberration sensitivity x, the 5th-order off-axis coma aberration sensitivity y, and the lens thickness sensitivity z as principal design parameters at 35° C.

That is, by using Expression (2), it is clarified that it is possible to minimize the lens tilt sensitivity of the objective lens at low temperature.

In addition, by using Expression (2), all of the 3rd-order off-axis coma aberration sensitivity x, the 5th-order off-axis coma aberration sensitivity y, and the lens thickness sensitivity z of the objective lens may be set to small values close to zero. In this case, it would appear that it is difficult to make the lens tilt sensitivity at low temperature equal to 130 mλrms/degree or less.

That is, in the method of respectively reducing the respective aberration sensitivities in the related art, conversely, the lens tilt sensitivity at low temperature is deteriorated. For this reason, it is preferable to make a well-balanced design in which the respective aberration sensitivities are made to fall within a range in which no problem arises in practice while the lens tilt sensitivity at low temperature is satisfied on the basis of Expression (2).

The objective lens according to the embodiment of the invention may also be configured such that a focal length f of the objective lens is 1.412 mm, the refractive index n of the resin material is 1.560, the refractive index gradient dn/dT of the resin material relative to the temperature thereof is $-1.09 \times 10^{4}$, and, assuming that 3rd-order and 5th-order coma aberrations caused when the optical axis of the rays incident to the objective lens is tilted by 1 degree with respect to the system optical axis at 35° C. are respectively a 3rd-order off-axis coma aberration sensitivity x [mλrms/degree] and a 5th-order off-axis coma aberration sensitivity y [mλrms/degree], and a length in an optical axis direction from a tangent plane, which passes through a surface vertex of a light-source-side optical surface of the objective lens, to a point, which is located on the light-source-side optical surface at a radius of 1.20 mm from the corresponding surface vertex of the light-source-side optical surface, is a light-source-side sag amount w [mm], the 3rd-order off-axis coma aberration sensitivity x, the 5th-order off-axis coma aberration sensitivity y, and the light-source-side sag amount w are respectively determined so that a function F(x, y, w) represented by the following Expression (3) is equal to 130 or less.

$$F(x,y,w)=-1.10x-0.20y+150.13w-11.94 \quad (3)$$

That is, in the objective lens, a linear relation is also established between the light-source-side sag amount w substituted for the lens thickness sensitivity z and the lens tilt sensitivity at 0° C. By using the linear relation, the 3rd-order off-axis coma aberration sensitivity x, the 5th-order off-axis coma aberration sensitivity y, and the corresponding light-source-side sag amount w at 35° C. are appropriately set to satisfy Expression (3). In such a manner, it is possible to minimize the lens tilt sensitivity at 0° C. As a result, it is possible to prevent the recording and reproducing characteristics from being deteriorated in the BD format.

According to another embodiment of the invention, there is provided an optical pickup including: a light source that emits rays with a wavelength of 410 nm or less; an objective lens that is made of a resin material and focuses the rays on an optical disc at a numerical aperture of 0.8 or more. When a lens tilt sensitivity is defined as an amount of a 3rd-order coma aberration caused per a lens tilt of 1 degree which is an angle formed between an optical axis of the objective lens and a system optical axis of an optical system including the objective lens at 0° C., the lens tilt sensitivity is 130 mλrms/degree or less.

In the optical pickup according to the embodiment of the invention, the value of the lens tilt sensitivity of the objective lens at low temperature (0° C.) is set to 130 mλrms/degree or less. Thereby, even when the corresponding objective lens is tilted with respect to the optical disc, by minimizing the occurrence amount of coma aberration, it is possible to prevent the recording and reproducing characteristics from being deteriorated in the BD format.

According to still another embodiment of the invention, there is provided an optical disc apparatus including: a light source that emits rays with a wavelength of 410 nm or less; a collimator lens that converges or diverges the rays; an objective lens that is made of a resin material and focuses the rays, which are incident through the collimator lens, on an optical disc at a numerical aperture of 0.8 or more, in which when a lens tilt sensitivity is defined as an amount of a 3rd-order coma aberration caused per a lens tilt of 1 degree which is an angle formed between an optical axis of the objective lens and a system optical axis of an optical system including the objective lens at 0° C., the lens tilt sensitivity is 130 mλrms/degree or less; a collimator lens moving section that moves the collimator lens in a direction along the system optical axis so as to change an incident magnification of the rays incident to the objective lens; and a control section that corrects spherical aberration by moving the collimator lens.

In the optical disc apparatus according to the embodiment of the invention, the value of the lens tilt sensitivity of the objective lens at low temperature (0° C.) is set to 130 mλrms/degree or less. Thereby, even when the corresponding objective lens is tilted with respect to the optical disc, by minimizing the occurrence amount of coma aberration, it is possible to prevent the recording and reproducing characteristics from being deteriorated in the BD format.

According to the embodiments of the invention, by setting the value of the lens tilt sensitivity of the objective lens at low temperature (0° C.) to 130 mλrms/degree or less, even when the corresponding objective lens is tilted with respect to the optical disc, by minimizing the occurrence amount of coma aberration, it is possible to prevent the recording and reproducing characteristics from being deteriorated in the BD format. In such a manner, in the embodiments of the invention, it is possible to embody the objective lens, the optical pickup, and the optical disc apparatus capable of suppressing the deterioration in optical characteristics caused by temperature change.

DESCRIPTION OF PREFERRED EMBODIMENTS

Figure 6:
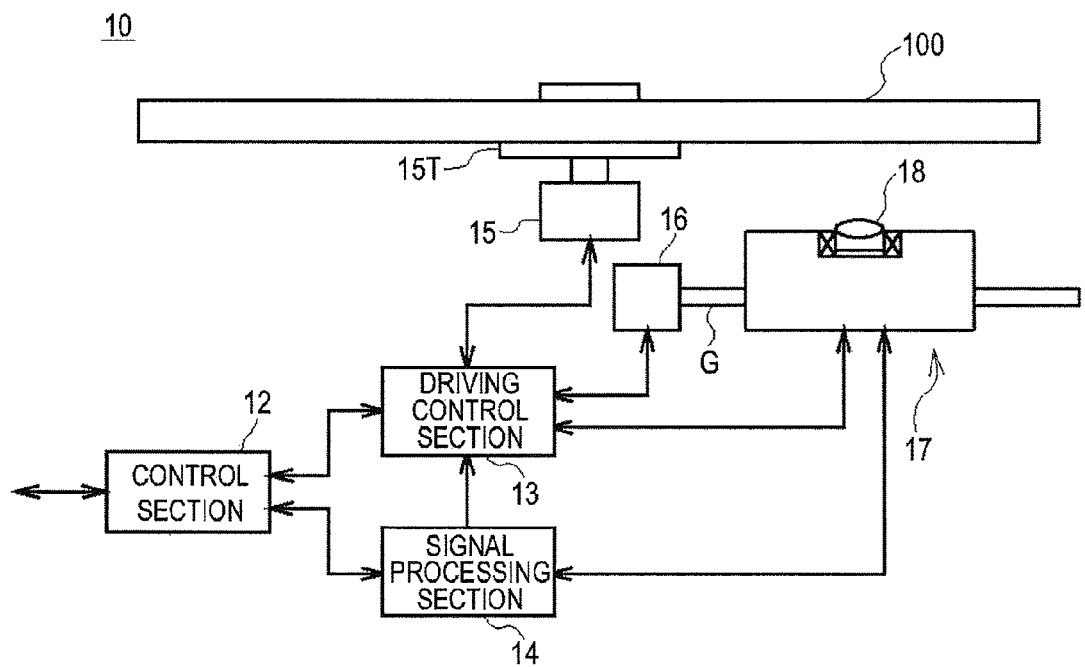
FIG. 6 is a schematic diagram illustrating an entire configuration of an optical disc apparatus.

Hereinafter, modes of carrying out the invention (hereinafter referred to as embodiments) will be described with reference to the accompanying drawings. In addition, description thereof will be given in the following order.
1. Embodiments
2. Design of Objective Lens
3. Numerical Examples
4. Operations and Advantages
5. Other Embodiments 1. Embodiments 1-1. Configuration of Optical Disc Apparatus As shown in FIG. 6, an optical disc apparatus 10 is configured to record information on an optical disc 100 of, for example, the BD format as an optical information recording medium, and reproduce the information from the corresponding optical disc 100. The optical disc 100 has a recording layer on which a spiral track is formed.

The optical disc apparatus 10 is configured to allow a control section 12 to control the entire apparatus. The control section 12 includes a CPU (Central Processing Unit), which is not shown, as a principal component thereof. The control section reads various programs from a ROM (Read Only Memory), which is not shown, and develops them into a RAM (Random Access Memory) which is not shown. With such a configuration, the control section 12 is configured to execute various processes such as an information recording process and an information reproducing process.

For example, when recording the information on the optical disc 100, the control section 12 receives an information recording command, recording information, and recording address information from external devices and the like which are not shown, supplies the recording address information and a driving command to a driving control section 13, and supplies the recording information to a signal processing section 14. In addition, the recording address information is information representing the address at which the recording information will be recorded.

The driving control section 13 controls the driving of a spindle motor 15 in response to the driving command, thereby rotating the optical disc 100, which is mounted on a turntable 15T, at a predetermined rotation speed. In addition, the driving control section 13 controls the driving of a thread motor 16, thereby moving an optical pickup 17 to a position corresponding to the recording address information in a radial direction (that is, an inner peripheral direction or an outer peripheral direction) of the optical disc 100 along a moving shaft G.

The signal processing section 14 generates a recording signal by performing various signal processes such as a predetermined encoding process and a modulation process on the supplied recording information, and supplies the signal to the optical pickup 17.

The optical pickup 17 adjusts a focal point F of a light beam L to the recording layer of the optical disc 100 by performing a focus control and a tracking control to be described later. In addition, the optical pickup 17 is configured to record information on the recording layer of the optical disc 100 by adjusting a light intensity of the light beam L in response to the recording signal transmitted from the signal processing section 14.

Further, when the information is reproduced from the optical disc 100, for example, the control section 12 may receive an information reproducing command and the like from external devices (not shown in the drawings). In this case, the control section supplies the driving command to the driving control section 13, and supplies the reproducing process command to the signal processing section 14.

Similarly to the case of recording the information, the driving control section 13 rotates the optical disc 100 at the predetermined rotation speed, thereby moving the optical pickup 17 to a position corresponding to the information reproducing command.

The optical pickup 17 adjusts a focal point F of a light beam L to the recording layer of the optical disc 100 by performing a focus control and a tracking control to be described later, and adjusts the light intensity of the light beam L to a light intensity for reproduction.

The light beam L is reflected by the recording layer, and is turned into a reflection light beam LR. The optical pickup 17 detects the reflection light beam LR, and supplies a light receiving signal corresponding to a light amount thereof to the signal processing section 14.

The signal processing section 14 generates reproduction information by performing various signal processes such as a predetermined demodulation process and a decoding process on the supplied light receiving signal, and supplies the reproduction signal to the control section 12. The control section 12 is configured to transmit the reproduction information to the external devices (not shown in the drawings).

In addition, it is assumed that an objective lens 18 used in the optical disc apparatus 10 is used within a temperature range of 0 to 70° C.

As described above, the optical disc apparatus 10 is configured to record the information on the optical disc 100 and reproduce the information from the corresponding optical disc 100 by allowing the control section 12 to control the optical pickup 17.

1-2. Configuration of Optical Pickup

Figure 7:
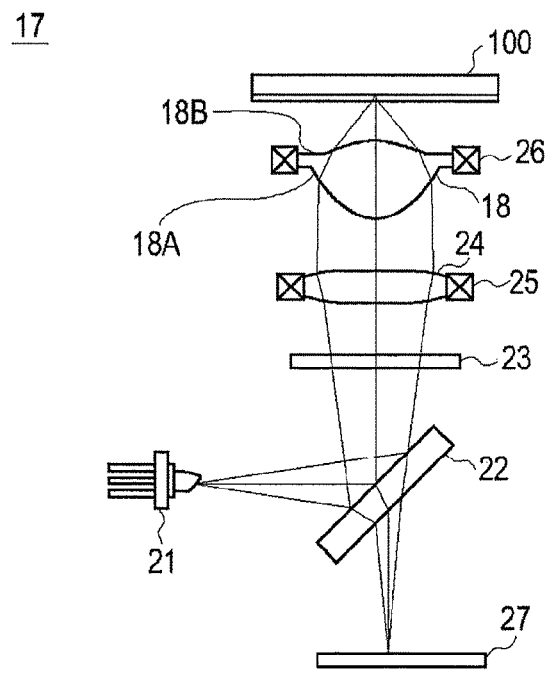
FIG. 7 is a schematic diagram illustrating a configuration of an optical pickup.

Next, the configuration of the optical pickup 17 will be described. The optical pickup 17 includes, as shown in FIG. 7, a plurality of optical elements.

A laser diode 21 emits the light beam L with a wavelength of about 405 nm on the basis of the control of the control section 12 and the signal processing section 14 (FIG. 6), and directs the beam such that it is incident into a polarizing beam splitter 22. In addition, the laser diode 21 adjusts an installation angle so as to convert the light beam L into S-polarized light.

The polarizing beam splitter 22 is configured to reflect or transmit the corresponding light beam in the proportion corresponding to a polarization direction of the light beam by a polarizing surface 22S. In practice, the polarizing beam splitter 22 reflects a component of the S-polarized light in the incident light beam L, that is, substantially the entirety thereof, and directs the beam such that it is incident to a ¼ wavelength plate 23.

The ¼ wavelength plate 23 is configured to convert the light beam between a linear polarization state and a circular polarization state bidirectionally. Thus, the ¼ wavelength plate converts the light beam L which is S-polarized into, for example, left-circularly-polarized light, and directs the beam such that it is incident to the collimator lens 24.

The collimator lens 24 converts the light beam L from divergent light into parallel light, and directs the beam such that it is incident to the objective lens 18. Further, the collimator lens 24 is configured to perform the position adjustment along the optical axis of the light beam L through an actuator 25.

The objective lens 18 is formed of a predetermined resin material by using a mold and the like. Further, the objective lens 18 has a light-source-side lens surface 18A on which the light beam L is incident from the laser diode 21, and a disc-side lens surface 18B that faces toward the optical disc 100 and emits the corresponding light beam L.

The objective lens 18 is, on the basis of the control of the driving control section 13, configured to be moved in the focusing direction and the tracking direction by the actuator 26, that is, to be subjected to the focus control and the tracking control.

In addition, the focusing direction represents a direction (that is, the vertical direction of FIG. 7) of approaching or separating from the optical disc 100. In addition, the tracking direction represents a direction (that is, the horizontal direction of FIG. 7) of moving to the inner peripheral side or the outer peripheral side of the optical disc 100.

The objective lens 18 focuses the light beam L, and adjusts the focal point F to the recording layer of the optical disc 100. At this time, on the recording layer of the optical disc 100, the light beam L is reflected, and is turned into the reflection light beam LR. In addition, the reflection light beam LR is turned into right circularly-polarized light since the rotation direction of the circularly polarized light is reversed at the time of reflection.

The reflection light beam LR is converted from divergent light into parallel light through the objective lens 18, and is converted into convergent light through the collimator lens 24. Then, the beam is converted into P-polarized light (linearly polarized light) through the ¼ wavelength plate 23, and is incident to the polarizing beam splitter 22.

The polarizing beam splitter 22 transmits the reflection light beam LR, which is P-polarized, through the polarizing surface 22S, and irradiates the beam onto a photodetector 27.

The photodetector 27 receives the irradiated reflection light beam LR by a plurality of light sensing areas, generates a light receiving signal corresponding to each light receiving amount, and supplies the signal to the signal processing section 14.

The signal processing section 14 is configured to generate a focus error signal, a tracking error signal, and a reproducing RF signal by performing a predetermined calculation process based on the light receiving signal.

Further, when spherical aberration is caused by temperature change, the optical pickup 17 controls the actuator 25, thereby moving the collimator lens 24.

In such a manner, the optical pickup 17 is configured to correct the 3rd-order spherical aberration, which is caused in accordance with the temperature in the vicinity of the objective lens 18 when the light beam L is irradiated onto the optical disc 100, through the collimator lens 24.

As described above, the optical pickup 17 is configured to focus the light beam L on the recording layer of the optical disc 100 through the objective lens 18 and to receive the reflection light beam LR.

2. Design of Objective Lens

2-1. Definition of Term

Figure 8:
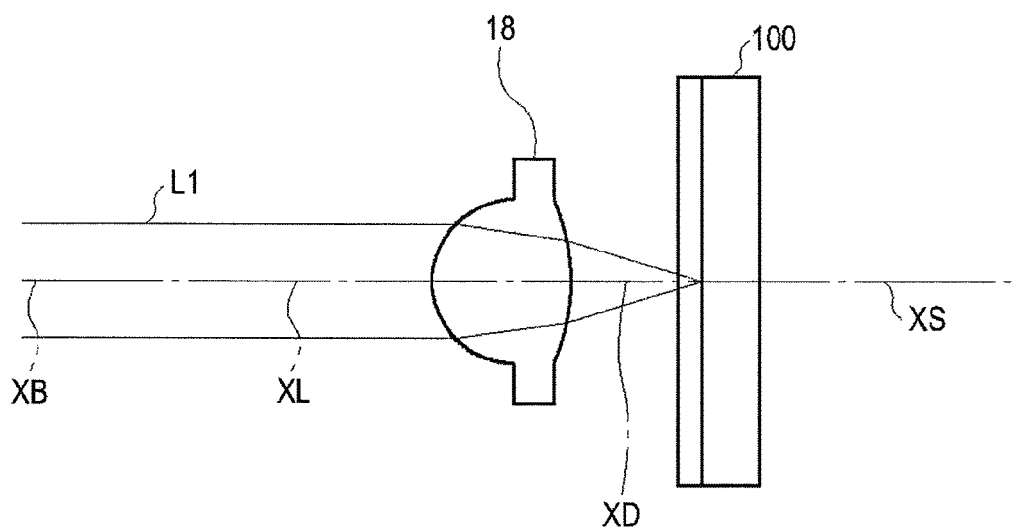
FIG. 8 is a schematic diagram illustrating a relationship among a system optical axis, a beam optical axis, a lens optical axis, and a disc optical axis in a designed condition.

Meanwhile, in the optical pickup 17, as shown in FIG. 8, the optical axis (hereinafter referred to as a system optical axis XS) in the optical system is defined, and then arrangement or the like of various optical elements is designed. In other words, the system optical axis XS corresponds to a line connecting all the optical centers of the respective optical elements in the optical pickup 17.

Generally, the optical pickup 17 is designed so that the system optical axis XS coincides with the optical axis (hereinafter referred to as a beam optical axis XB) of the light beam L (hereinafter referred to as an incidence light beam L1), which is incident to the objective lens 18.

Further, the optical pickup 17 is designed so that the system optical axis XS also coincides with the optical axis (hereinafter referred to as a lens optical axis XL), which connects the centers of curvature of the light-source-side lens surface 18A and the disc-side lens surface 18B of the objective lens 18.

Further, the optical pickup 17 is designed so that the system optical axis XS also coincides with the normal line (hereinafter referred to as a disc optical axis XD) at the position, onto which the light beam L is irradiated, on the optical disc 100.

Hereinafter, as shown in FIG. 8, in the normal optical pickup 17, the condition, in which the system optical axis XS coincides with all of the beam optical axis XB, the lens optical axis XL, and the disc optical axis XD, is referred to as a designed condition. Further, each condition of the incidence light beam L1, the objective lens 18, and the optical disc 100 at this time are referred to as a designed condition.

Figure 9:
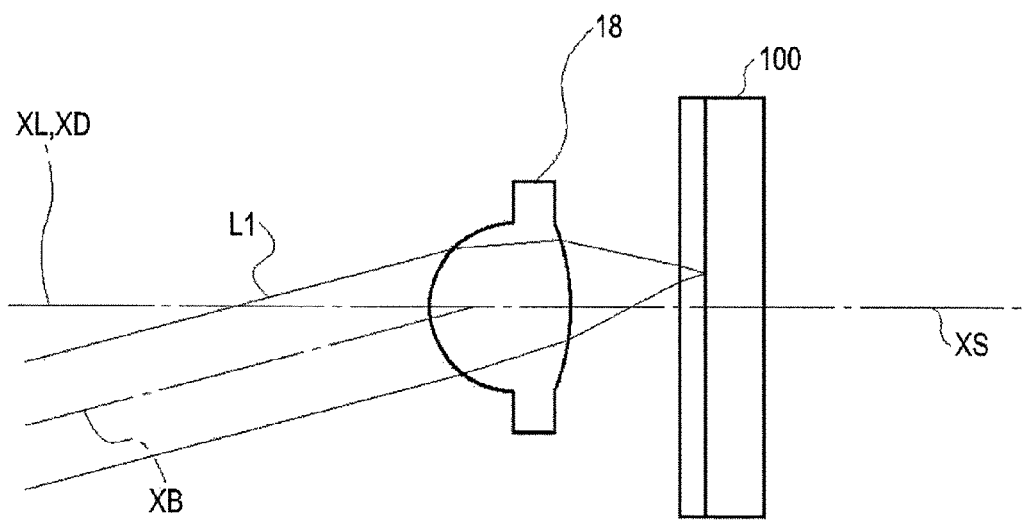
FIG. 9 is a schematic diagram illustrating a tilt of the beam optical axis with respect to the system optical axis in an off-axis condition.
Figure 10:
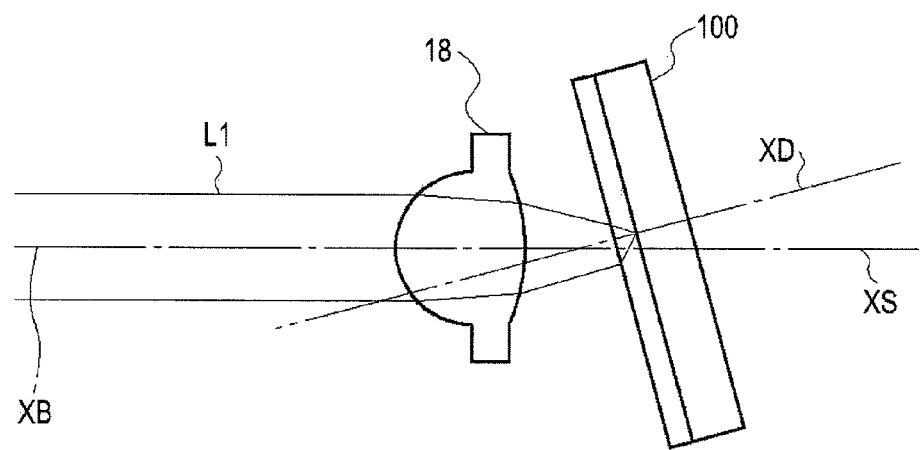
FIG. 10 is a schematic diagram illustrating a tilt of the disc optical axis with respect to the system optical axis in a disc tilt condition.
Figure 11:
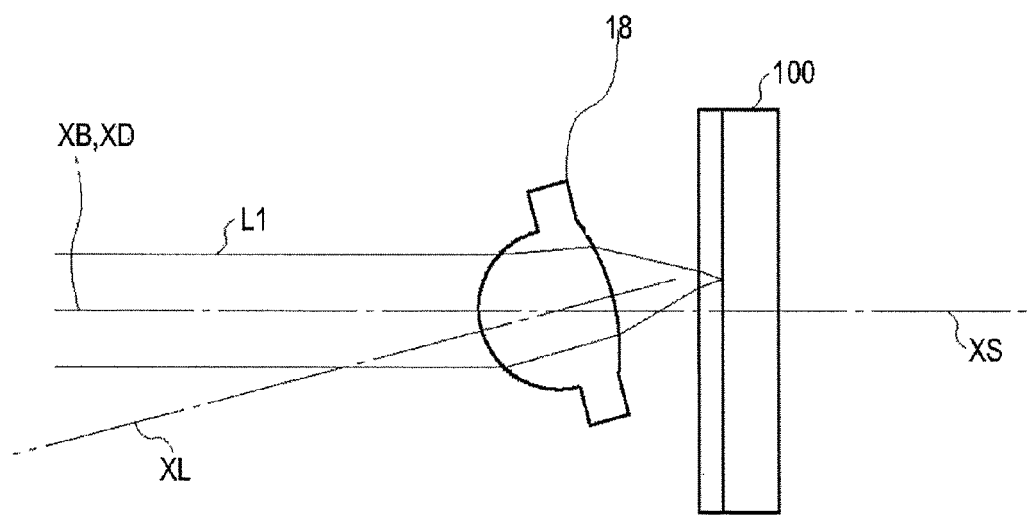
FIG. 11 is a schematic diagram illustrating a tilt of the lens optical axis with respect to the system optical axis in a lens tilt condition.

As it is, in the actual optical pickup 17, for example as shown in FIG. 9, the beam optical axis XB is likely to be tilted with respect to the system optical axis XS. Further, in the optical pickup 17, for example as shown in FIG. 10, the disc optical axis XD is likely to be tilted with respect to the system optical axis XS. Furthermore, in the optical pickup 17, for example as shown in FIG. 11, the lens optical axis XL is likely to be tilted with respect to the system optical axis XS.

Hereinafter, the respective conditions shown in FIGS. 9 to 11 will be described in order of precedence.

2-1-1. Off-Axis Condition and Off-Axis Coma Aberration Sensitivity

As shown in FIG. 9, in the designed condition of the objective lens 18 and the optical disc 100, only the incidence light beam L1 is tilted, that is, the lens optical axis XL and the disc optical axis XD coincides with the system optical axis XS. Thus, the condition, in which only the beam optical axis XB is tilted with respect to the system optical axis XS, is referred to as an off-axis condition. Further, at this time, an incident angle θB is defined as an angle formed between the beam optical axis XB and the system optical axis XS.

Here, when an operating temperature of the objective lens is 35° C., the 3rd-order off-axis coma aberration sensitivity x [mλrms/degree] and the 5th-order off-axis coma aberration sensitivity y [mλrms/degree] are respectively defined as occurrence amounts of the 3rd-order and 5th-order coma aberrations which are caused per the incident angle θB of 1 degree. The aberration characteristics in the off-axis condition are also called off-axis characteristics.

Generally, as all the values of the 3rd-order off-axis coma aberration sensitivity x and the 5th-order off-axis coma aberration sensitivity y are closer to zero, the amounts of the coma aberrations, which are caused when the incidence light beam L1 is tilted with respect to the system optical axis XS, are smaller. Accordingly, it can be inferred that, in principal, it is preferable to set the 3rd-order off-axis coma aberration sensitivity x and the 5th-order off-axis coma aberration sensitivity y to values close to zero, respectively.

2-1-2. Disc Tilt Condition

Next, as shown in FIG. 10, in the designed condition of the incidence light beam L1 and the objective lens 18, only the optical disc 100 is tilted, that is, the beam optical axis XB and the lens optical axis XL coincides with the system optical axis XS. Thus, the condition, in which only the disc optical axis XD is tilted with respect to the system optical axis XS, is referred to as a disc tilt condition.

In the optical pickup 17, the tilt of the optical disc 100 also causes the 3rd-order and 5th-order coma aberrations. The aberration characteristics in the disc tilt condition are also called disc tilt characteristics.

2-1-3. Lens Tilt Condition and Lens Tilt Sensitivity

Next, as shown in FIG. 11, in the designed condition of the incidence light beam L1 and the optical disc 100, only the objective lens 18 is tilted, that is, the beam optical axis XB and the disc optical axis XD coincides with the system optical axis XS. Thus, the condition, in which only the lens optical axis XL is tilted with respect to the system optical axis XS, is referred to as a lens tilt condition. Further, at this time, a lens tilt θL is defined as an angle formed between the lens optical axis XL and the system optical axis XS.

Further, a lens tilt sensitivity LT [mλrms/degree] is defined as an amount of the 3rd-order coma aberration which is caused per the lens tilt θL of 1 degree in the objective lens 18. Further, the aberration characteristics in the lens tilt condition are also called lens tilt characteristics.

In addition, the lens tilt sensitivity LT is a value calculated under a condition in which the 3rd-order spherical aberration caused by temperature change and the like are corrected by the collimator lens 24.

In addition, the coma aberration caused in the above-mentioned off-axis condition is substantially equal to the sum of the coma aberrations respectively caused in the lens tilt condition and disc tilt condition.

2-1-4. Lens Thickness Sensitivity

Figure 12:
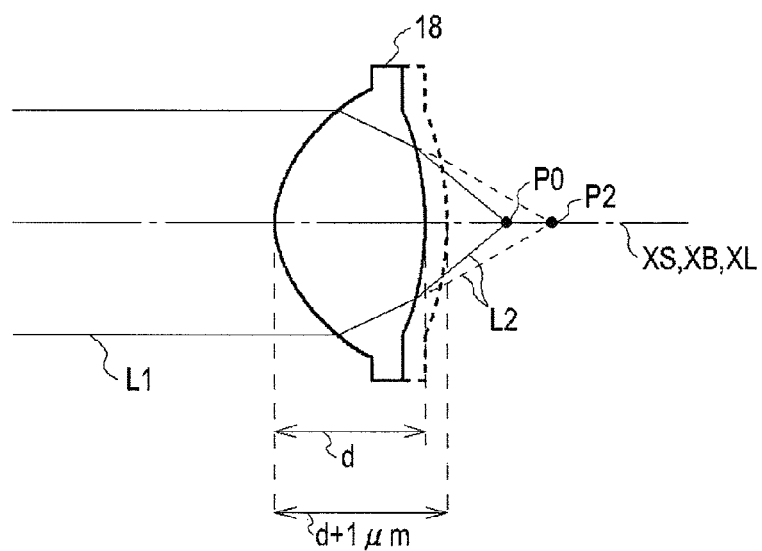
FIG. 12 is a schematic diagram illustrating change in lens center thickness.

Incidentally, manufacturing errors and the like may cause differences between the thickness of the objective lens 18 and its designed value. For example, as shown in FIG. 12, a space between the centers on the lens surfaces of the objective lens 18 is represented by the lens center thickness d [mm]. When the lens center thickness d is changed to d mm+1 μm, the difference in the center thickness causes spherical aberration.

Here, a lens thickness sensitivity z [mλrms/μm] is defined as an occurrence amount of the 3rd-order spherical aberration which is caused when the lens center thickness d increases by 1 μm at 35° C.

Generally, as the value of the lens thickness sensitivity z is closer to zero, the amount of the spherical aberration amount, which is caused when the lens thickness is different from the designed value, is smaller. Accordingly, it can be inferred that, in principle, it is also preferable to set the lens thickness sensitivity z to a value close to zero.

2-2. Derivation of Expression for Calculation of Lens Tilt Sensitivity

Hereinafter, it is assumed that the focal length f is 1.412 mm, the refractive index of the resin material at the wavelength of 405 nm is 1.560, and the refractive index gradient dn/dT relative to temperature is $-1.09 \times 10^{-4}$. In the case of the objective lens under the assumption, a procedure of deriving an expression for calculation of the lens tilt sensitivity LT will be described.

First, the lens thickness sensitivity z is fixed to 0, the 5th-order off-axis coma aberration sensitivity y is set to each of −10, 0 and +10 mλrms/degree, and the 3rd-order off-axis coma aberration sensitivity x is changed within the range of −25 to +25 mλrms/degree. In such a manner, a plurality of objective lenses was designed.

Regarding each objective lens, each lens tilt sensitivity LT at 0° C. was calculated, and the relationship between the 3rd-order off-axis coma aberration sensitivity x and the corresponding lens tilt sensitivity LT was plotted. In such a manner, the distribution characteristics shown in FIG. 13 were obtained. In addition, in FIG. 13, the 5th-order off-axis coma aberration sensitivities y, which are respectively set to −10, 0, and +10 mλrms/degree, are respectively and distinctly indicated by the black triangle, the black circle, and the black square.

Figure 13:
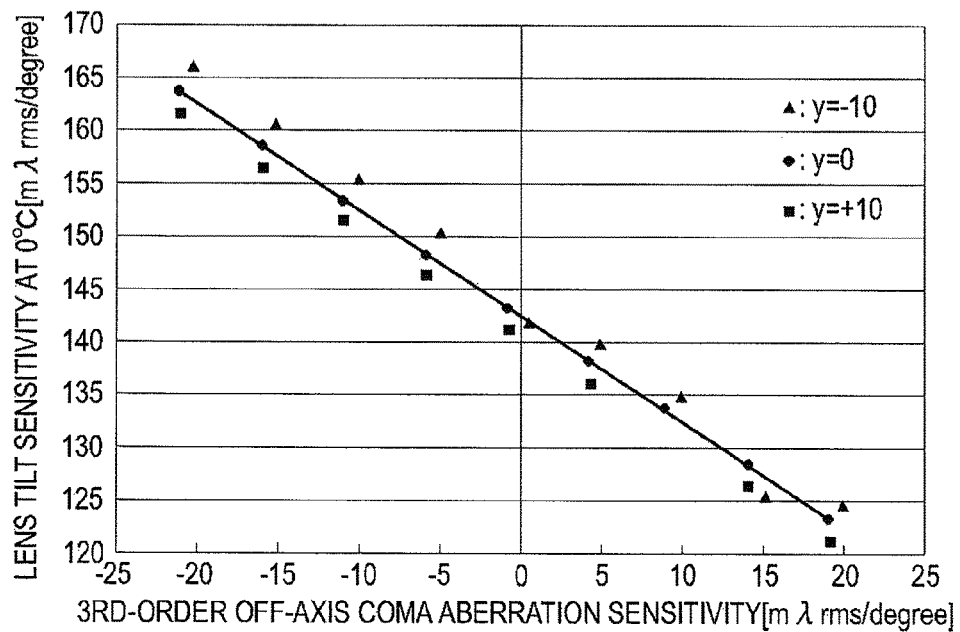
FIG. 13 is a schematic diagram illustrating a relationship (1) between a 3rd-order off-axis coma aberration sensitivity and the lens tilt sensitivity at 0° C.

It can be seen from the distribution characteristics of FIG. 13 that a substantially linear dependence relationship (dependencies) is established between the 3rd-order off-axis coma aberration sensitivity x and the lens tilt sensitivity LT for each value of the 5th-order off-axis coma aberration sensitivity y. Therefore, on the basis of the distribution characteristics of FIG. 13, the lens tilt sensitivity LT is approximated as the function F(x, y) of the 3rd-order off-axis coma aberration sensitivity x and the 5th-order off-axis coma aberration sensitivity y, and can be then represented by the following Expression (4).

$$F(x,y) = -1.05x - 0.27y + 144.0 \qquad (4)$$

Next, the 3rd-order off-axis coma aberration sensitivity x is fixed to a value of 0 mλrms/degree, the 5th-order off-axis coma aberration sensitivity y is set to each of −10, 0 and +10 mλrms/degree, and the lens thickness sensitivity z is changed within the range of −6 to +6 mλrms/μm. In such a manner, a plurality of objective lenses was designed.

Regarding each objective lens, each lens tilt sensitivity LT at 0° C. is calculated, and the relationship between the lens thickness sensitivity z and the corresponding lens tilt sensitivity LT was plotted. In such a manner, the distribution characteristics shown in FIG. 14 were obtained. In addition, in FIG. 14, similarly to the case of FIG. 13, the 5th-order off-axis coma aberration sensitivities y, which are respectively set to −10, 0, and +10 mλrms/degree, are respectively and distinctly indicated by the black triangle, the black circle, and the black square.

Figure 14:
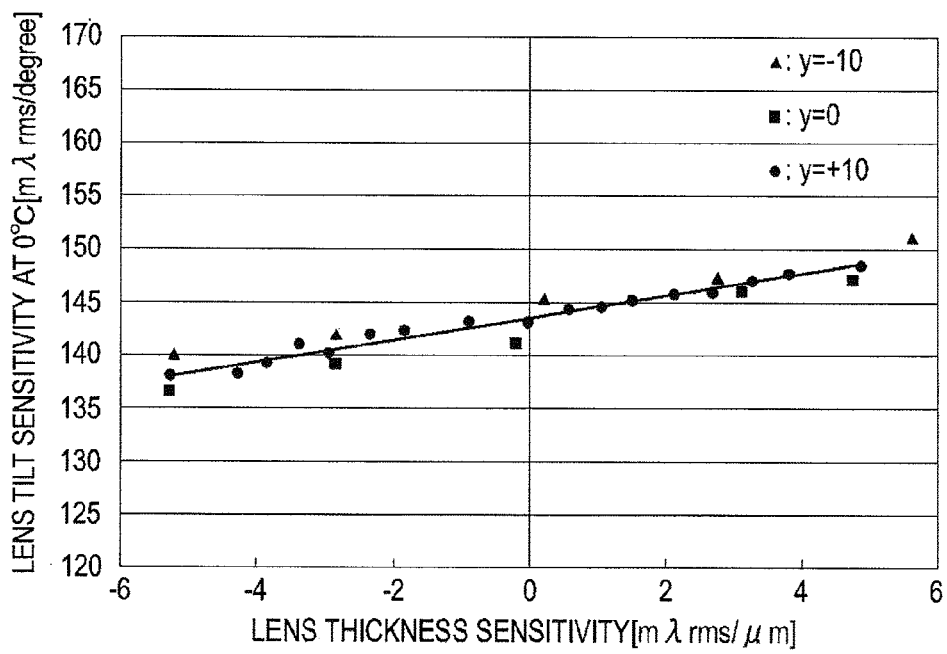
FIG. 14 is a schematic diagram illustrating a relationship between a lens thickness sensitivity and the lens tilt sensitivity at 0° C.

It can be seen from the distribution characteristics of FIG. 14 that, similarly to the case of the 3rd-order off-axis coma aberration sensitivity x, a substantially linear dependence relationship (dependencies) is also established between the lens thickness sensitivity z and the lens tilt sensitivity LT for each value of the 5th-order off-axis coma aberration sensitivity y. Therefore, on the basis of Expression (4) and the distribution of FIG. 14, the lens tilt sensitivity LT is approximated as the function F(x, y, z) of the 3rd-order off-axis coma aberration sensitivity x, the 5th-order off-axis coma aberration sensitivity y, and the lens thickness sensitivity z, and can be then represented by the following Expression (5).

$$F(x,y,z)=-1.05x-0.27y+1.03z+144.0 \quad (5)$$

Expression (5) shows the following facts: the lens tilt sensitivity LT is defined by combination of the 3rd-order off-axis coma aberration sensitivity x, the 5th-order off-axis coma aberration sensitivity y, and the lens thickness sensitivity z, and is a 1st-order expression and has a linear relation for each value.

Here, the 5th-order off-axis coma aberration sensitivity y is fixed to a value of 0 mλrms/degree, the lens thickness sensitivity z is fixed to a value of −5 or +5 mλrms/μm, and the 3rd-order off-axis coma aberration sensitivity x is appropriately changed within the range of −25 to +25 mλrms/degree. In such a manner, a plurality of objective lenses was designed.

Regarding each objective lens, the relationship between the 3rd-order off-axis coma aberration sensitivity x and the corresponding lens tilt sensitivity LT at 0° C. was plotted. In such a manner, the distribution characteristics shown in FIG. 15 were obtained. In addition, in FIG. 15, the lens thickness sensitivities z, which are respectively set to +5.0 and −5.0 mλrms/μm, are respectively and distinctly indicated by the white square and the white triangle.

Figure 15:
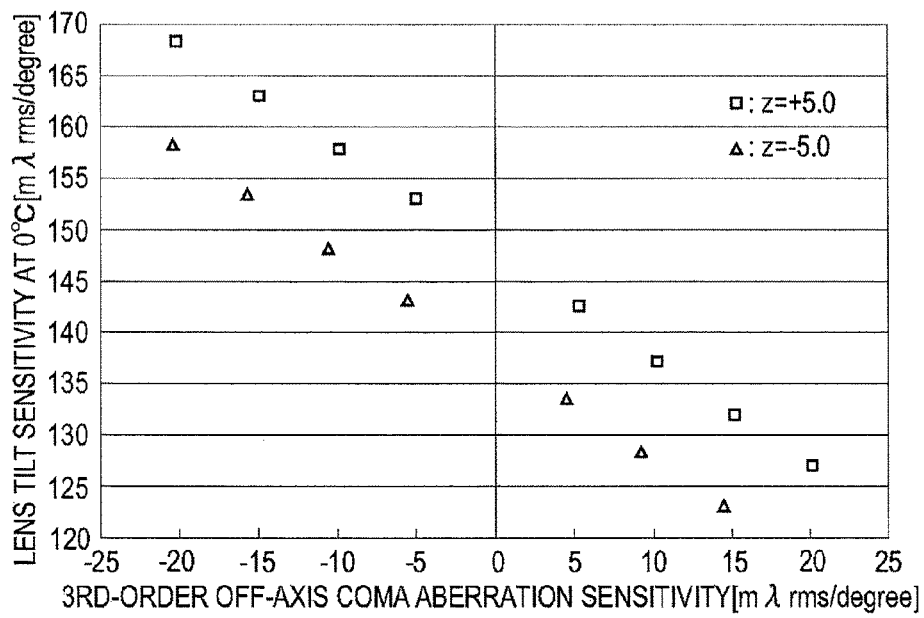
FIG. 15 is a schematic diagram illustrating a relationship (2) between the 3rd-order off-axis coma aberration sensitivity and the lens tilt sensitivity at 0° C.

It can be seen from the distribution characteristics of FIG. 15 that lens tilt sensitivity LT is approximated with a sufficiently small error by Expression (5).

As described above, it was discovered that the lens tilt sensitivity LT of the objective lens 18 is satisfactorily approximated by the function F(x, y, z) of Expression (5) based on the 3rd-order off-axis coma aberration sensitivity x, the 5th-order off-axis coma aberration sensitivity y, and the lens thickness sensitivity z.

In addition, it is also assumed that the focal length f is in the range of $1.35 \leq f \leq 1.48$, the refractive index n is in the range of $1.54 \leq n \leq 1.58$, and the refractive index gradient dn/dT is in the range of $-1.10 \times 10^{-4} \leq dn/dT \leq -1.00 \times 10^{-4}$. Even in the case of the objective lens under the assumption, the lens tilt sensitivity LT thereof can be approximated with a sufficiently small error by the above-mentioned Expression (5).

2-3. Skew Margin

Meanwhile, in the optical disc apparatus 10, as an ideal condition (the designed condition, FIG. 8), it is assumed that the beam optical axis XB of the light beam L is not tilted with respect to the disc optical axis XD of the optical disc 100 and the corresponding light beam L is irradiated onto the corresponding optical disc 100.

As it is, in the actual optical disc apparatus 10, a slight angle (referred to as a so-called skew or tilt) is formed between the system optical axis XS and the disc optical axis XD of the optical disc 100.

For this reason, in the BD format, from the viewpoint of securing compatibility and the like, the skew margin, that is, a tolerance of the tilt angle of the disc optical axis XD of the optical disc 100 with respect to the system optical axis XS is defined to be 0.75 degrees on the basis of the standard thereof (Blu-ray Disc Format White paper). That is to say, the skew margin in the BD format is defined to be 0.75 degrees in terms of disc tilt conversion.

Here, the occurrence factors of the skew in the optical disc apparatus 10 can be roughly classified into a "disc factor" arising from the optical disc 100, a "pickup factor" arising from the optical pickup 17, and "remaining factors after adjustment and control" other than those.

In the optical disc apparatus 10, by setting the tolerance for each occurrence factor of the skew, even when the skews caused by the respective occurrence factors are accumulated, the tolerance of the total skew is made to be equal to or less than 0.75 degrees in terms of the disc tilt conversion.

Hereinafter, the respective items classified into three will be described in order of precedence.

First, the disc factor as the first item arises from the optical disc 100 itself such as warpage or deformation of the optical disc 100.

In the optical disc apparatus 10, the tolerance of the skew of the disc factor is set to 0.4 degrees under the "sudden change" test conditions in the Blu-ray Disc Read-Only Format.

The pickup factor as a second item further includes a plurality of factors. Here, as a typical example thereof, particularly, a "D-skew factor", which is an item directly associated with the lens tilt sensitivity addressed in the invention, will be described.

In the optical disc apparatus 10, when the objective lens 18 is moved in the focusing direction in the optical pickup 17, the corresponding objective lens 18 may not be translated and be tilted because of the structure such as a support wire (not shown in the drawings) which swingably supports the corresponding objective lens 18. The tilt angle of the objective lens 18 is called the D-skew. However, the value thereof is defined by electrical and mechanical error factors, and is set to 0.10 degrees in a most typical example.

Here, in order to study the skew margin defined by a disc-tilt-converted value, it is desired to perform conversion into a disc tilt angle which causes coma aberration. When the value of the lens tilt sensitivity is set, by performing a predetermined conversion process thereon, it is possible to obtain the converted disc tilt angle.

For example, when the value of the lens tilt sensitivity is set to 130 mλrms/degree, the D-skew factor converted in terms of the disc tilt angle is equal to about 0.10 degrees.

Further, when the items other than the D-skew factor in the pickup factors are collected as "other factors", the value thereof is defined to be 0.29 degrees. In addition, in the plurality of factors included herein, there is also an item depending on the lens tilt sensitivity.

Finally, the "remaining factors after adjustment and control" arise from the remaining after adjustment in the assembly adjustment process of the optical disc apparatus 10, and the remaining after control of the optical pickup 17, and the like. In addition, the typical value thereof is defined to be 0.15 degrees.

The tolerances of the disc tilt angles for each occurrence factor under the design condition C1 shown in Table 2 are collectively arranged and shown in the column of design condition C1 of Table 3.

TABLE 2

VALUES OF LENS TILT SENSITIVITY AND D-skew

|  | DESIGN CONDITION C1 | DESIGN CONDITION C2 | DESIGN CONDITION C3 |
| --- | --- | --- | --- |
| LENS TILT SENSITIVITY [mλrms/degree] | 130 | 115 | 100 |
| D-skew[degree] | 0.10 | 0.15 | 0.20 |

TABLE 3

TOLERANCE FOR EACH SKEW OCCURRENCE FACTOR

| SKEW OCCURRENCE FACTOR | | DESIGN CONDITION C1 | DESIGN CONDITION C2 | DESIGN CONDITION C3 |
| --- | --- | --- | --- | --- |
| DISC FACTOR[degree] | | 0.40 | 0.40 | 0.40 |
| PICKUP FACTOR [degree] | D-skew FACTOR (DISC TILT CONVERSION) | 0.10 | 0.13 | 0.15 |
|  | OTHER FACTOR | 0.29 | 0.29 | 0.28 |
| REMAINING FACTOR AFTER ADJUSTMENT AND CONTROL[degree] | | 0.15 | 0.15 | 0.15 |

As regards the skew arising from the optical disc apparatus 10, that is, as regards the skews of various factors belonging to the pickup factor and the remaining factors after adjustment and control, a large number of elements are independently distributed in the corresponding optical disc apparatus 10. Hence, there is an extremely low possibility that all of them become the maximum at the same time.

Therefore, as regards the skew of various factors belonging to the pickup factor and the remaining factors after adjustment and control, in accordance with the statistical method, the value, which is obtained by finding the square root of the sum of the square values of the respective tolerances of the skews, is treated as the tolerance of the skew arising from the optical disc apparatus 10.

Due to the treatment, in the design condition C1 of Table 3, the skew is made to fall within 0.75 degrees which is the tolerance of the skew margin. Conversely, in the case where the tolerance of the D-skew is defined to be 0.10 degrees, it would appear that, when the lens tilt sensitivity of the objective lens 18 is designed to be 130 mλrms/degree or less, it is possible to secure the skew margin.

Here, the lens tilt sensitivity LT of the objective lens 18 at 0° C. can be satisfactorily approximated, as shown in Expression (5), by the function $F(x, y, z)$ using the 3rd-order off-axis coma aberration sensitivity x, the 5th-order off-axis coma aberration sensitivity y, and the lens thickness sensitivity z at 35° C. as variables.

That is, in the case where the value of the D-skew of the objective lens 18 is set to 0.10 degrees, by using the combination of the 3rd-order off-axis coma aberration sensitivity x, the 5th-order off-axis coma aberration sensitivity y, and the lens thickness sensitivity z so as to satisfy the following Expression (6), the total skew can be made to fall within an allowable range of 0.75 degrees or less.

$$F(x,y,z) = -1.05x - 0.27y + 1.03z + 144.0 \leq 130.00 \quad (6)$$

Incidentally, in the design condition C1, the typical value of the tolerance of the D-skew factor is defined to be 0.10 degrees. Here, further relaxing the value of the D-skew factor from 0.10 degrees means that the percent defective of a support wire mechanism (the actuator) is reduced, and thus it can be inferred that the relaxation greatly contributes to reduction in cost.

The design conditions C2 and C3 in Table 2 are for studying the cases where the D-skew tolerance is relaxed up to 0.15 degrees and 0.20 degrees on the basis of prediction of the future demand for reduction in cost.

In this case, the values of the respective occurrence factors are as shown in the design conditions C2 and C3 in Table 3. Thus, it can be observed that, when the above-mentioned statistical process is performed on the values, the skews in the design conditions are made to fall within 0.75 degrees as the tolerance of the skew margin.

Conversely, in the case where the D-skew tolerance is defined to be 0.15 degrees, it would appear that it is possible to secure the skew margin when the lens tilt sensitivity of the objective lens 18 is designed to be 115 mλrms/degree or less. In the case where the D-skew tolerance is defined to be 0.20 degrees, it would appear that it is possible to secure the skew margin when the lens tilt sensitivity of the objective lens is designed to be 100 mλrms/degree or less.

Further, the lens tilt sensitivity LT of the objective lens 18 at 0° C. is obtained by the function $F(x, y, z)$ represented by Expression (5) in the cases of the design conditions C2 and C3.

That is, in the case where the value of the D-skew of the objective lens 18 is set to 0.15 degrees, by using the combination of the 3rd-order off-axis coma aberration sensitivity x, the 5th-order off-axis coma aberration sensitivity y, and the lens thickness sensitivity z so as to satisfy the following Expression (7), the total skew can be made to fall within the allowable range of 0.75 degrees or less.

$$F(x,y,z) = -1.05x - 0.27y + 1.03z + 144.0 \leq 115.00 \quad (7)$$

In the case where the value of the D-skew of the objective lens 18 is set to 0.20 degrees, by using the combination of the 3rd-order off-axis coma aberration sensitivity x, the 5th-order off-axis coma aberration sensitivity y, and the lens thickness sensitivity z so as to satisfy the following Expression (8), the total skew can be made to fall within the allowable range of 0.75 degrees or less.

$$F(x,y,z) = -1.05x - 0.27y + 1.03z + 144.0 \leq 100.00 \quad (8)$$

Meanwhile, generally in the optical disc apparatus 10, as the allowable range of the coma aberration which is caused when the optical axis of the laser diode 21 assembled in the optical pickup 17 is tilted from the optical axis (that is, system optical axis XS) in design, for example, the 3rd-order and 5th-order coma aberrations caused at a tilt angle of 0.2 degrees are made to be equal to or less than 5 mλrms.

On the other hand, the 3rd-order off-axis coma aberration sensitivity x and the 5th-order off-axis coma aberration sensitivity y are, as described above, the occurrence amounts of the 3rd-order and 5th-order coma aberrations respectively caused at the incident angle θB of 1 degree. Accordingly, it is preferable that the 3rd-order off-axis coma aberration sensitivity x and the 5th-order off-axis coma aberration sensitivity y should be set in the ranges represented by the following Expressions (9) and (10).

$$-25.00 \leq x \leq +25.00 \qquad (9)$$

$$-25.00 \leq y \leq +25.00 \qquad (10)$$

Further, it is preferable that the lens thickness sensitivity z is set in the range of the following Expression (11) as a range that has less effect on various measurements at the time of manufacture.

$$-25.00 \leq z \leq +25.00 \qquad (11)$$

Furthermore, it can be also considered that the 3rd-order and 5th-order coma aberrations, which are caused when the optical axis of the laser diode 21 assembled in the optical pickup 17 is tilted by 0.2 degrees from the optical axis (the system optical axis XS), are designed to be suppressed to a smaller value, that is, 3 mλrms or less.

This means that the 3rd-order off-axis coma aberration sensitivity x and the 5th-order off-axis coma aberration sensitivity y are made to fall within the ranges respectively represented by the following Expressions (12) and (13).

$$-15.00 \leq x \leq +15.00 \qquad (12)$$

$$-15.00 \leq y \leq +15.00 \qquad (13)$$

In accordance therewith, it is preferable that the lens thickness sensitivity z is more restricted as compared with the range of Expression (11) so as to fall within the range which is represented by the following Expression (14).

$$-15.00 \leq z \leq +15.00 \qquad (14)$$

As described above, in the objective lens 18, the 3rd-order off-axis coma aberration sensitivity x, the 5th-order off-axis coma aberration sensitivity y, and the lens thickness sensitivity z are selected to satisfy Expressions (6), (7), and (8). Accordingly, it was discovered that the lens tilt sensitivity LT at 0° C. is made to be equal to or less than the tolerance of 130, 115, or 100 mλrms/degree.

In such a manner, the optical disc apparatus 10 is able to suppress the skew margin to the defined value or less by making the D-skew equal to or less than 0.10, 0.15, or 0.20 degrees.

Incidentally, by modifying Expression (6), as shown in the following Expression (15), the lens thickness sensitivity z can be represented as a function of the 3rd-order off-axis coma aberration sensitivity x and the 5th-order off-axis coma aberration sensitivity y.

$$z(x,y) \leq 1.02x + (0.26y - 12.62) \qquad (15)$$

Further, also by modifying Expression (7), as shown in the following Expression (16), the lens thickness sensitivity z can be represented as a function of the 3rd-order off-axis coma aberration sensitivity x and the 5th-order off-axis coma aberration sensitivity y.

$$z(x,y) \leq 1.02x + (0.26y - 28.16) \qquad (16)$$

That is, the 3rd-order off-axis coma aberration sensitivity x, the 5th-order off-axis coma aberration sensitivity y, and the lens thickness sensitivity z are actually restricted within the range satisfying Expression (15) or (16).

Here, in Expressions (15) and (16), it is assumed that the value of the 5th-order off-axis coma aberration sensitivity y is fixed. Under this assumption, the relationship between the 3rd-order off-axis coma aberration sensitivity x and the lens thickness sensitivity z can be represented, as shown in FIG. 16, by the straight lines for each value of the 5th-order off-axis coma aberration sensitivity y.

Figure 16:
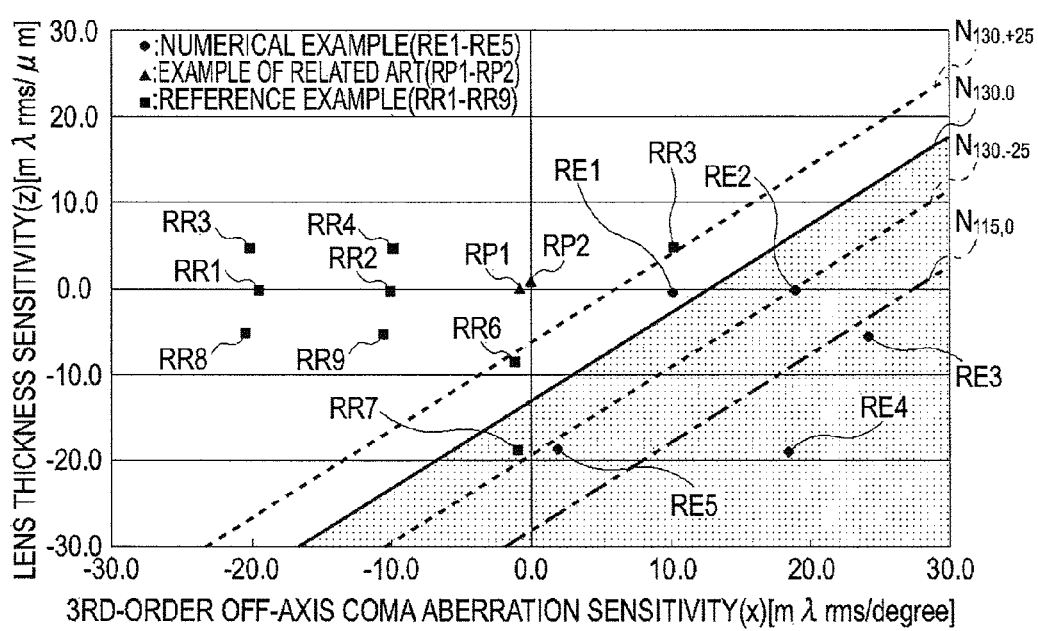
FIG. 16 is a schematic diagram illustrating a relationship of the 3rd-order off-axis coma aberration sensitivity, a 5th-order off-axis coma aberration sensitivity, and the lens thickness sensitivity according to numerical examples, a reference example and an example of the related art.

In FIG. 16, the straight line N130, 0 represents the case of F(x, y, z)=130 and the 5th-order off-axis coma aberration sensitivity y=0. At this time, the range of the combination of the 3rd-order off-axis coma aberration sensitivity x and the lens thickness sensitivity z satisfying the function F(x, y, z)≤130 is indicated by the hatching.

Further, in FIG. 16, the straight line N130, +25 represents the case of F(x, y, z)=130 and y=+25, the straight line N130, −25 represents the case of F(x, y, z)=130 and y=−25, and the straight line N115, 0 represents the case of F(x, y, z)=115 and y=0.

Furthermore, in FIG. 16, on the basis of the 3rd-order off-axis coma aberration sensitivities x and the lens thickness sensitivities z of the objective lenses SE1 to SE5 according to the first numerical example to fifth numerical example to be described later, the calculated points RE1 to RE5 were plotted by the black circles.

Although detailed description thereof will be given later, all the objective lenses SE1 to SE5 were designed to satisfy Expression (6). Hence, it can be seen that the calculated points RE1 to RE5 are distributed mostly within the hatched range in the drawings or in the vicinity thereof.

Further, in FIG. 16, on the basis of the 3rd-order off-axis coma aberration sensitivities x and the lens thickness sensitivities z of the above-mentioned typical objective lenses SP1 and SP2, the calculated points RP1 and RP2 were plotted by the black triangles.

As described above, the typical objective lenses SP1 and SP2 were designed to set the 3rd-order off-axis coma aberration sensitivities x, the 5th-order off-axis coma aberration sensitivities y, and the lens thickness sensitivities z to a value close to 0. Hence, the calculated points RP1 and RP2 are distributed near the origin, and are out of the hatched range.

That is, it can be seen from FIG. 16 that, even when the respective aberration sensitivities are simply designed to be close to 0, it is difficult to suppress the lens tilt sensitivity LT of the objective lens at 0° C. to 130 mλrms/degree or less.

Furthermore, as a reference example, the objective lenses SR1 to SR9 were designed on the basis of the combinations of the 3rd-order off-axis coma aberration sensitivities x, the 5th-order off-axis coma aberration sensitivities y, and the lens thickness sensitivities z, in which the combinations do not satisfy Expression (6) since the function F(x, y, z)>130. The dimensional values of the objective lenses SR1 to SR9 were as shown in the following Tables 4 to 6.

TABLE 4

DIMENSIONAL VALUES OF OBJECTIVE LENS IN REFERENCE EXAMPLE (1)

| NUMBER | | SR1 | SR2 | SR3 | SR4 |
|---|---|---|---|---|---|
| FOCAL LENGTH f[mm] | | 1.412 | 1.412 | 1.412 | 1.412 |
| REFRACTIVE INDEX n | | 1.560 | 1.560 | 1.560 | 1.560 |
| TEMPERATURE REFRACTIVE INDEX GRADIENT dn/dT | | $-1.09 \times 10^{-4}$ | $-1.09 \times 10^{-4}$ | $-1.09 \times 10^{-4}$ | $-1.09 \times 10^{-4}$ |
| LIGHT-SOURCE-SIDE LENS SURFACE | RDY | 0.955084 | 0.954186 | 0.941194 | 0.940247 |
| | K | −0.603198 | −0.602743 | −0.527476 | −0.527533 |
| | A | 0.025380 | 0.025758 | 0.011587 | 0.011982 |
| | B | −0.049887 | −0.049960 | −0.054629 | −0.054634 |
| | C | 0.339699 | 0.339742 | 0.338183 | 0.338237 |
| | D | −1.092533 | −1.092446 | −1.094162 | −1.094075 |
| | E | 2.099527 | 2.099527 | 2.099527 | 2.099527 |
| | F | −2.430514 | −2.430514 | −2.430514 | −2.430514 |
| | G | 1.670105 | 1.670105 | 1.670105 | 1.670105 |
| | H | −0.624328 | −0.624328 | −0.624328 | −0.624328 |
| | J | 0.097039 | 0.097039 | 0.097039 | 0.097039 |
| DISC-SIDE LENS SURFACE | RDY | −1.481431 | −1.485894 | −1.545135 | −1.550381 |
| | K | −43.107218 | −44.371479 | −35.759200 | −36.873129 |
| | A | 0.262033 | 0.261449 | 0.335881 | 0.335616 |
| | B | −0.161692 | −0.162486 | −0.284780 | −0.286225 |
| | C | −0.621885 | −0.621578 | −0.502084 | −0.502876 |
| | D | 0.699821 | 0.701631 | 0.661544 | 0.665470 |
| | E | 0.741653 | 0.741653 | 0.741653 | 0.741653 |
| | F | −0.979282 | −0.979282 | −0.979282 | −0.979282 |
| | G | −1.046755 | −1.046755 | −1.046755 | −1.046755 |
| | H | 1.866865 | 1.866865 | 1.866865 | 1.866865 |
| | J | −0.698326 | −0.698326 | −0.698326 | −0.698326 |
| 3RD-ORDER OFF-AXIS COMA ABERRATION SENSITIVITY x[mλrms/degree] | | −19.5 | −10.1 | −20.1 | −9.8 |
| 5TH-ORDER OFF-AXIS COMA ABERRATION SENSITIVITY y[mλrms/degree] | | 20.9 | 20.8 | 0.8 | 1.1 |
| LENS THICKNESS SENSITIVITY z[mλrms/μm] | | −0.1 | −0.2 | 4.8 | 4.8 |
| LIGHT-SOURCE-SIDE SAG AMOUNT w[mm] | | 1.025 | 1.028 | 1.063 | 1.067 |
| LENS TILT SENSITIVITY LT at 0° C. [mλrms/degree] | | 160.22 | 149.77 | 168.35 | 157.83 |
| APPROXIMATION BASED ON F(x, y, z) [mλrms/degree] | | 158.69 | 148.81 | 169.84 | 158.92 |
| APPROXIMATION BASED ON F(x, y, w) [mλrms/degree] | | 159.24 | 149.39 | 169.58 | 158.77 |

TABLE 5

DIMENSIONAL VALUES OF OBJECTIVE LENS IN REFERENCE EXAMPLE (2)

| NUMBER | | SR5 | SR6 | SR7 | SR8 |
|---|---|---|---|---|---|
| FOCAL LENGTH f[mm] | | 1.412 | 1.412 | 1.412 | 1.412 |
| REFRACTIVE INDEX n | | 1.560 | 1.560 | 1.560 | 1.560 |
| TEMPERATURE REFRACTIVE INDEX GRADIENT dn/dT | | $-1.09 \times 10^{-4}$ | $-1.09 \times 10^{-4}$ | $-1.09 \times 10^{-4}$ | $-1.09 \times 10^{-4}$ |
| LIGHT-SOURCE-SIDE LENS SURFACE | RDY | 0.939226 | 0.965657 | 0.985007 | 0.960712 |
| | K | −0.519924 | −0.652760 | −0.857741 | −0.690346 |
| | A | 0.011996 | 0.043049 | 0.082818 | 0.044007 |
| | B | −0.056183 | −0.074754 | −0.104042 | −0.062384 |
| | C | 0.339727 | 0.373386 | 0.414475 | 0.360759 |
| | D | −1.095386 | −1.109181 | −1.128488 | −1.101666 |
| | E | 2.099527 | 2.099527 | 2.099527 | 2.099527 |
| | F | −2.430514 | −2.430514 | −2.430514 | −2.430514 |
| | G | 1.670105 | 1.670105 | 1.670105 | 1.670105 |
| | H | −0.624328 | −0.624328 | −0.624328 | −0.624328 |
| | J | 0.097039 | 0.097039 | 0.097039 | 0.097039 |

TABLE 5-continued

DIMENSIONAL VALUES OF OBJECTIVE LENS IN REFERENCE EXAMPLE (2)

| NUMBER | | SR5 | SR6 | SR7 | SR8 |
|---|---|---|---|---|---|
| DISC-SIDE LENS SURFACE | RDY | −1.555307 | −1.439838 | −1.371777 | −1.458717 |
| | K | −40.796077 | −49.335235 | −49.710544 | −44.789285 |
| | A | 0.318823 | 0.179593 | 0.100751 | 0.213800 |
| | B | −0.259016 | −0.125082 | −0.037845 | −0.148394 |
| | C | −0.516227 | −0.544321 | −0.607416 | −0.556018 |
| | D | 0.666794 | 0.620264 | 0.638575 | 0.638085 |
| | E | 0.741653 | 0.741653 | 0.741653 | 0.741653 |
| | F | −0.979282 | −0.979282 | −0.979282 | −0.979282 |
| | G | −1.046755 | −1.046755 | −1.046755 | −1.046755 |
| | H | 1.866865 | 1.866865 | 1.866865 | 1.866865 |
| | J | −0.698326 | −0.698326 | −0.698326 | −0.698326 |
| 3RD-ORDER OFF-AXIS COMA ABERRATION SENSITIVITY x[mλrms/degree] | | 10.3 | −1.1 | −0.9 | −20.5 |
| 5TH-ORDER OFF-AXIS COMA ABERRATION SENSITIVITY y[mλrms/degree] | | 1.1 | −0.3 | 1.2 | 0.5 |
| LENS THICKNESS SENSITIVITY z[mλrms/μm] | | 4.8 | −8.5 | −18.8 | −5.2 |
| LIGHT-SOURCE-SIDE SAG AMOUNT w[mm] | | 1.072 | 0.981 | 0.920 | 0.997 |
| LENS TILT SENSITIVITY LT at 0° C. [mλrms/degree] | | 137.20 | 135.92 | 133.06 | 158.30 |
| APPROXIMATION BASED ON F(x, y, z) [mλrms/degree] | | 137.85 | 136.49 | 125.29 | 160.04 |
| APPROXIMATION BASED ON F(x, y, w) [mλrms/degree] | | 137.46 | 136.59 | 126.97 | 160.15 |

TABLE 6

DIMENSIONAL VALUES OF OBJECTIVE LENS IN REFERENCE EXAMPLE (3)

| NUMBER | | SR9 |
|---|---|---|
| FOCAL LENGTH f[mm] | | 1.412 |
| REFRACTIVE INDEX n | | 1.560 |
| TEMPERATURE REFRACTIVE INDEX GRADIENT dn/dT | | −1.09 × 10⁻⁴ |
| LIGHT-SOURCE-SIDE LENS SURFACE | RDY | 0.959649 |
| | K | −0.695829 |
| | A | 0.045111 |
| | B | −0.061709 |
| | C | 0.360417 |
| | D | −1.101346 |
| | E | 2.099527 |
| | F | −2.430514 |
| | G | 1.670105 |
| | H | −0.624328 |
| | J | 0.097039 |
| DISC-SIDE LENS SURFACE | RDY | −1.462924 |
| | K | −46.144597 |
| | A | 0.212736 |
| | B | −0.150502 |
| | C | −0.548281 |
| | D | 0.632812 |
| | E | 0.741653 |
| | F | −0.979282 |
| | G | −1.046755 |
| | H | 1.866865 |
| | J | −0.698326 |
| 3RD-ORDER OFF-AXIS COMA ABERRATION SENSITIVITY x[mλrms/degree] | | −10.5 |
| 5TH-ORDER OFF-AXIS COMA ABERRATION SENSITIVITY y[mλrms/degree] | | 0.4 |
| LENS THICKNESS SENSITIVITY z[mλrms/μm] | | −5.2 |
| LIGHT-SOURCE-SIDE SAG AMOUNT w[mm] | | 1.000 |
| LENS TILT SENSITIVITY LT at 0° C. [mλrms/degree] | | 148.32 |
| APPROXIMATION BASED ON F(x, y, z) [mλrms/degree] | | 149.59 |
| APPROXIMATION BASED ON F(x, y, w) [mλrms/degree] | | 149.70 |

Further, on the basis of the 3rd-order off-axis coma aberration sensitivities x and the lens thickness sensitivities z of the objective lenses SR1 to SR9, the calculated points RR1 to RR9 were plotted in FIG. 16 by the black squares.

That is, it can be seen from the calculated points RR1 to RR9 of FIG. 16 that the calculated points are mostly out of the hatched range when the 3rd-order off-axis coma aberration sensitivities x, the 5th-order off-axis coma aberration sensitivities y, and the lens thickness sensitivities z do not satisfy Expression (6).

2-4. Regulation of Lens Tilt Sensitivity based on Sag Amount

Figure 17:
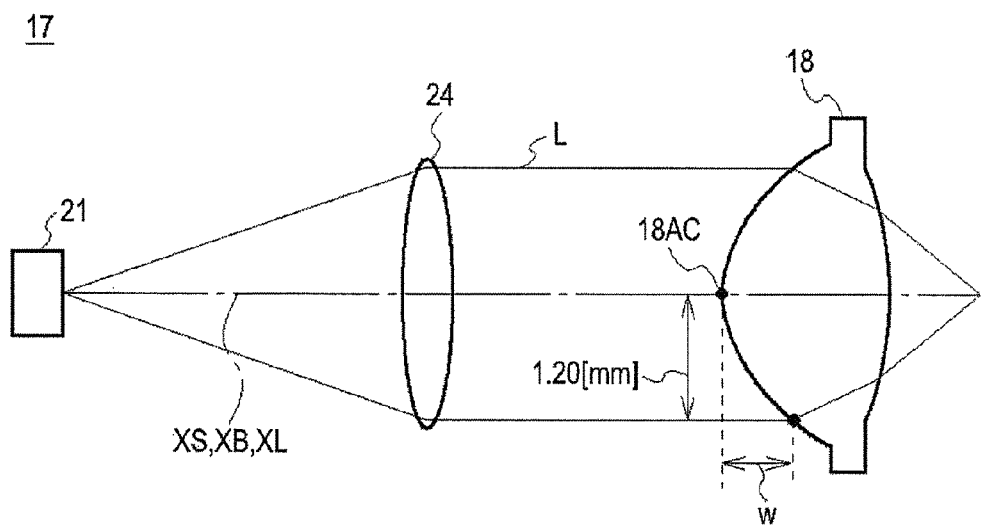
FIG. 17 is a schematic diagram illustrating a definition of a light-source-side sag amount.

Meanwhile, as shown in FIG. 17, in the objective lens 18 of the optical pickup 17, a length in the optical axis direction from the tangent plane, which passes through a surface vertex 18AC of the light-source-side optical surface, to the point, which is located on the light-source-side optical surface at a radius of 1.20 mm from the corresponding surface vertex 18AC thereof, is called a light-source-side sag amount w at 35° C.

Here, a plurality of objective lenses was designed by variously modifying the 3rd-order off-axis coma aberration sensitivity x, the 5th-order off-axis coma aberration sensitivity y, the lens thickness sensitivity z, and the light-source-side sag amount w.

Specifically, the combination of the 5th-order off-axis coma aberration sensitivity y and the lens thickness sensitivity z is fixed to (0, 0), (10, 0) or (−10, 0), the 3rd-order off-axis coma aberration sensitivity x is appropriately changed, and thereby various objective lenses were designed. Further, the combination of the 3rd-order off-axis coma aberration sensitivity x and the 5th-order off-axis coma aberration sensitivity y is fixed to (0, 0), (0, 10) or (0, −10), the lens thickness sensitivity z is appropriately changed, and thereby various objective lenses were designed.

Figure 18:
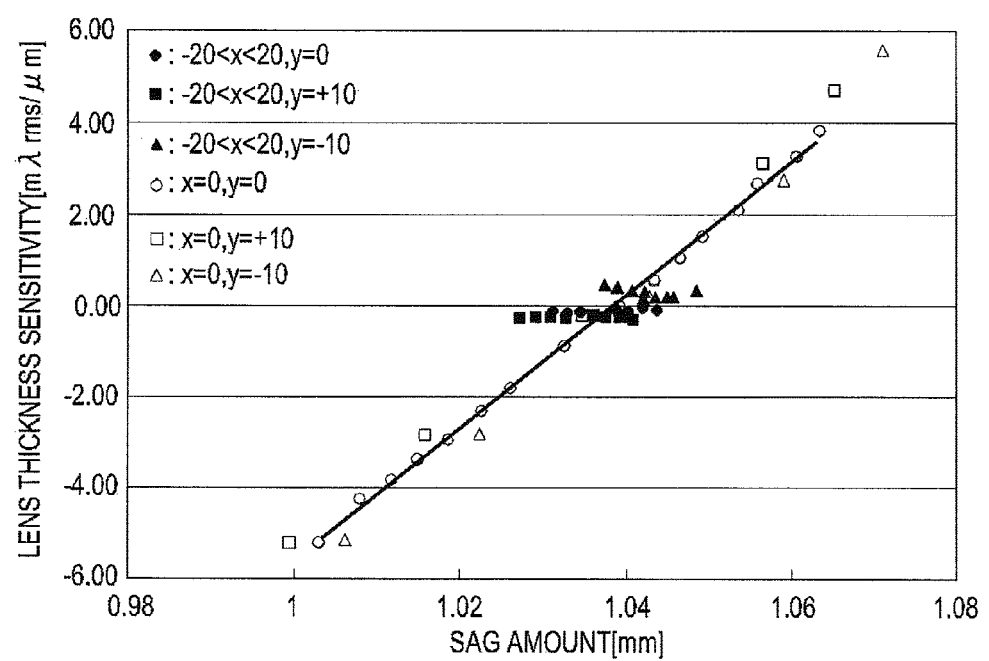
FIG. 18 is a schematic diagram illustrating a relationship between a sag amount and the lens thickness sensitivity.

Regarding the objective lenses designed as described above, the relationships between the lens thickness sensitivities z and the light-source-side sag amounts w were collectively arranged, and thus it was possible to obtain the distribution characteristics shown in FIG. 18.

In addition, in FIG. 18, the lens thickness sensitivities z are fixed at values of around 0 mλrms/μm, the range of the 3rd-order off-axis coma aberration sensitivities x is freely set in the range of −20 mλrms/degree to 20 mλrms/degree, the 5th-order off-axis coma aberration sensitivities y are respectively set to 0, 10, and −10 mλrms/degree. In this case, the sensitivities are distinctly indicated by the black circles, the black squares, and the black triangles. Further, in FIG. 18, the 3rd-order off-axis coma aberration sensitivities x are fixed to values of around 0 mλrms/degree, and 5th-order off-axis coma aberration sensitivities y are respectively set to 0, 10, and −10 mλrms/degree. In this case, the sensitivities are distinctly indicated by the white squares and the white triangles.

On the basis of the distribution characteristics of FIG. 18, the lens thickness sensitivity z can be represented, as shown in the following Expression (17), as the function G(x, y, w) of the 3rd-order off-axis coma aberration sensitivity x, the 5th-order off-axis coma aberration sensitivity y, and the light-source-side sag amount w.

$$z = G(x,y,w) = -0.050x - 0.068y + 145.76w - 151.40 \quad (17)$$

By using Expression (17), the lens tilt sensitivity LT at 0° C. represented by Expression (5) can be represented as the function F(x, y, w) by the following Expression (18).

$$F(x,y,w) = F(x,y,G(x,y,w)) = -1.05x - 0.27y + 1.03\{G(x,y,w)\} + 144.0 = -1.05x - 0.27y + 1.03(-0.050x - 0.068y + 145.76w - 151.40) + 144.0 = -1.10x - 0.20y + 150.13w - 11.94 \quad (18)$$

Further, also in the function F(x, y, w) of Expression (18), similarly to Expressions (6), (7), and (8), the tolerance of the lens tilt sensitivity LT is set to 130, 115, or 100 mλrms/degree, and can be thereby represented as the following Expressions (19), (20), and (21).

$$F(x,y,w) = -1.10x - 0.20y + 150.13w - 11.94 \leq 130.00 \quad (19)$$

$$F(x,y,w) = -1.10x - 0.20y + 150.13w - 11.94 \leq 115.00 \quad (20)$$

$$F(x,y,w) = -1.10x - 0.20y + 150.13w - 11.94 \leq 100.00 \quad (21)$$

Furthermore, on the basis of Expression (17) and the ranges of the 3rd-order off-axis coma aberration sensitivity x, the 5th-order off-axis coma aberration sensitivity y, and the lens thickness sensitivity z represented by Expressions (9) to (11), the preferred range of the light-source-side sag amount w can be represented as the following Expression (22).

$$0.85 \leq w \leq 1.23 \quad (22)$$

In addition, the minimum of the light-source-side sag amount w is obtained by respectively substituting the minimum of the lens thickness sensitivity z, the minimum of the 3rd-order off-axis coma aberration sensitivity x, and the maximum of the 5th-order off-axis coma aberration sensitivity y. Further, the maximum of the light-source-side sag amount w is obtained by respectively substituting the maximum of the lens thickness sensitivity z, the maximum of the 3rd-order off-axis coma aberration sensitivity x, and the minimum of the 5th-order off-axis coma aberration sensitivity y.

As described above, in the objective lens 18, by satisfying Expressions (19), (20), or (21) using the light-source-side sag amount w instead of the lens thickness sensitivity z in addition to the 3rd-order off-axis coma aberration sensitivity x and the 5th-order off-axis coma aberration sensitivity y, the lens tilt sensitivity LT at 0° C. can be made to be equal to or less than the tolerance of 130, 115, or 100 mλrms/degree.

3. Numerical Examples

Hereinafter, by respectively changing the 3rd-order off-axis coma aberration sensitivity x, the 5th-order off-axis coma aberration sensitivity y, the lens thickness sensitivity z, and the light-source-side sag amount w so as to satisfy the above-mentioned Expression (6), (7), (19), or (20), the objective lenses SE1 to SE5 were respectively designed as numerical examples.

In addition, each of the objective lenses SE1 to SE5 was designed as a single objective lens of which the focal length f is 1.412 mm, the refractive index n of the resin material is 1.560, and the numerical aperture (NA) is 0.85 when the light beam L with the wavelength of 405 nm is incident as parallel light. Further, each of the objective lenses SE1 to SE5 was designed so that the temperature refractive index gradient dn/dT thereof is $-1.09 \times 10^{-4}$. Furthermore, the cover layer of the optical disc 100 was designed so that the thickness thereof is 0.0875 mm and the refractive index thereof is 1.62.

3-1. First Numerical Example

In a first numerical example, the objective lens SE1 was designed so that, as shown in the dimensional values of Table 7, the 3rd-order off-axis coma aberration sensitivity x is 10.1 mλrms/degree, the 5th-order off-axis coma aberration sensitivity y is 31.1 mλrms/degree, the lens thickness sensitivity z is −0.5 mλrms/μm, and the light-source-side sag amount w is 1.030 mm.

TABLE 7

DIMENSIONAL VALUES OF FIRST NUMERICAL EXAMPLE

| NUMBER | SE1 | |
|---|---|---|
| FOCAL LENGTH f[mm] | 1.412 | |
| REFRACTIVE INDEX n | 1.560 | |
| TEMPERATURE REFRACTIVE INDEX GRADIENT dn/dT | $-1.09 \times 10^{-4}$ | |
| | LIGHT-SOURCE-SIDE LENS SURFACE | DISC-SIDE LENS SURFACE |
| RDY | 0.955809 | −1.478581 |
| K | −0.617882 | −49.053709 |
| A | 0.029145 | 0.251232 |
| B | −0.047846 | −0.138643 |

TABLE 7-continued

DIMENSIONAL VALUES OF FIRST NUMERICAL EXAMPLE

| NUMBER | SE1 |
|---|---|
| C | 0.338292 −0.655563 |
| D | −1.091135 0.721556 |
| E | 2.099527 0.741653 |
| F | −2.430514 −0.979282 |
| G | 1.670105 −1.046755 |
| H | −0.624328 1.866865 |
| J | 0.097039 −0.698326 |
| 3RD-ORDER OFF-AXIS COMA ABERRATION SENSITIVITY x[mλrms/degree] | 10.1 |
| 5TH-ORDER OFF-AXIS COMA ABERRATION SENSITIVITY y[mλrms/degree] | 31.1 |
| LENS THICKNESS SENSITIVITY z[mλrms/μm] | −0.5 |
| LIGHT-SOURCE-SIDE SAG AMOUNT w[mm] | 1.030 |
| LENS TILT SENSITIVITY LT at 0° C. [mλrms/degree] | 127.31 |
| APPROXIMATION BASED ON F(x, y, z) [mλrms/degree] | 124.48 |
| APPROXIMATION BASED ON F(x, y, w) [mλrms/degree] | 125.33 |

Figure 19:
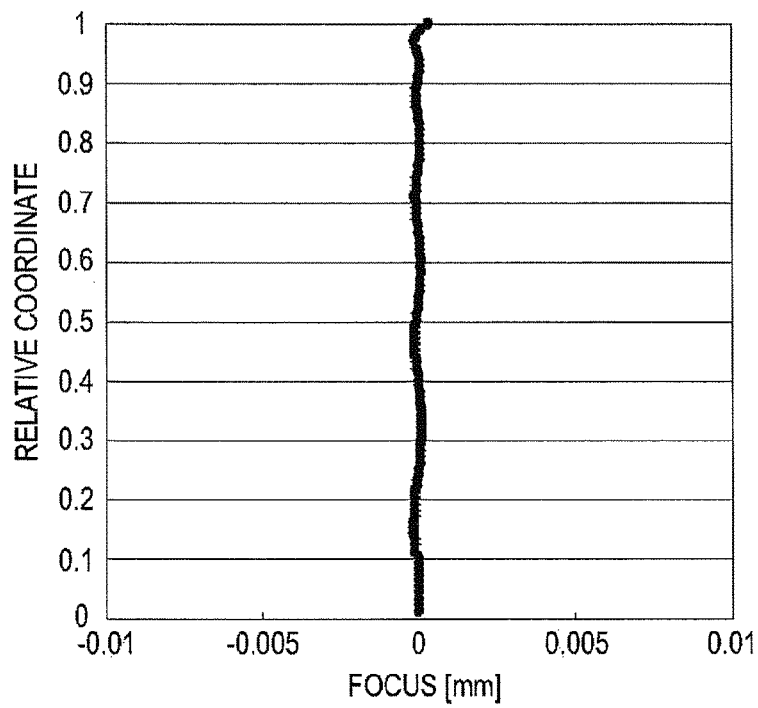
FIG. 19 is a schematic diagram illustrating a longitudinal aberration diagram of an objective lens according to a first numerical example.

The shape of each surface of the objective lens SE1 was formed as an aspheric surface which is represented by applying the respective coefficients (aspheric surface coefficients) of Table 7 to the distance ASP (R) represented in Expression (1). Further, regarding the objective lens SE1, it is possible to obtain the optical characteristics shown in the longitudinal aberration diagram of FIG. 19.

The value of the lens tilt sensitivity LT at 0° C. of the objective lens SE1 was set to be 127.31 mλrms/degree, and was set to be equal to or less than the tolerance of 130 mλrms/degree.

Further, it can be observed that the values calculated by the functions F(x, y, z) and F(x, y, w) are 124.48 and 125.33 mλrms/degree respectively and all the values of the lens tilt sensitivities at 0° C. are appropriately approximated.

This means that, in the optical disc apparatus 10 equipped with the objective lens SE1, it is possible to suppress the lens tilt sensitivity LT at 0° C. to 130 mλrms/degree or less, and thus it is possible to secure the skew margin when the D-skew is made to be equal to or less than 0.10 degrees which is the tolerance shown in the design condition C1 of Table 2.

As a result, the objective lens SE1 is able to sufficiently minimize the occurrence amount of coma aberration at any temperature in the range of 0 to 70° C. In accordance therewith, the optical disc apparatus 10 equipped with the objective lens SE1 is able to appropriately focus the light beam L onto the optical disc 100 at an intended area even at the low temperature of, for example, 0° C., and is thus able to reliably record and reproduce information.

3-2. Second Numerical Example

In a second numerical example, the objective lens SE2 was designed so that, as shown in the dimensional values of Table 8, the 3rd-order off-axis coma aberration sensitivity x is 19.0 mλrms/degree, the 5th-order off-axis coma aberration sensitivity y is 0.6 mλrms/degree, the lens thickness sensitivity z is −0.2 mλrms/μm, and the light-source-side sag amount w is 1.045 mm.

TABLE 8

DIMENSIONAL VALUES OF SECOND NUMERICAL EXAMPLE

| NUMBER | SE2 |
|---|---|
| FOCAL LENGTH f[mm] | 1.412 |
| REFRACTIVE INDEX n | 1.560 |
| TEMPERATURE REFRACTIVE INDEX GRADIENT dn/dT | −1.09 × 10$^{-4}$ |

| | LIGHT-SOURCE-SIDE LENS SURFACE | DISC-SIDE LENS SURFACE |
|---|---|---|
| RDY | 0.944983 | −1.526645 |
| K | −0.606807 | −45.872546 |
| A | 0.025939 | 0.260472 |
| B | −0.048169 | −0.171475 |
| C | 0.337964 | −0.593053 |
| D | −1.091313 | 0.682800 |
| E | 2.099527 | 0.741653 |
| F | −2.430514 | −0.979282 |
| G | 1.670105 | −1.046755 |
| H | −0.624328 | 1.866865 |
| J | 0.097039 | −0.698326 |

| | |
|---|---|
| 3RD-ORDER OFF-AXIS COMA ABERRATION SENSITIVITY x[mλrms/degree] | 19.0 |
| 5TH-ORDER OFF-AXIS COMA ABERRATION SENSITIVITY y[mλrms/degree] | 0.6 |
| LENS THICKNESS SENSITIVITY z[mλrms/μm] | −0.2 |
| LIGHT-SOURCE-SIDE SAG AMOUNT w[mm] | 1.045 |
| LENS TILT SENSITIVITY LT at 0° C. [mλrms/degree] | 123.31 |
| APPROXIMATION BASED ON F(x, y, z) [mλrms/degree] | 123.68 |
| APPROXIMATION BASED ON F(x, y, w) [mλrms/degree] | 123.94 |

Figure 20:
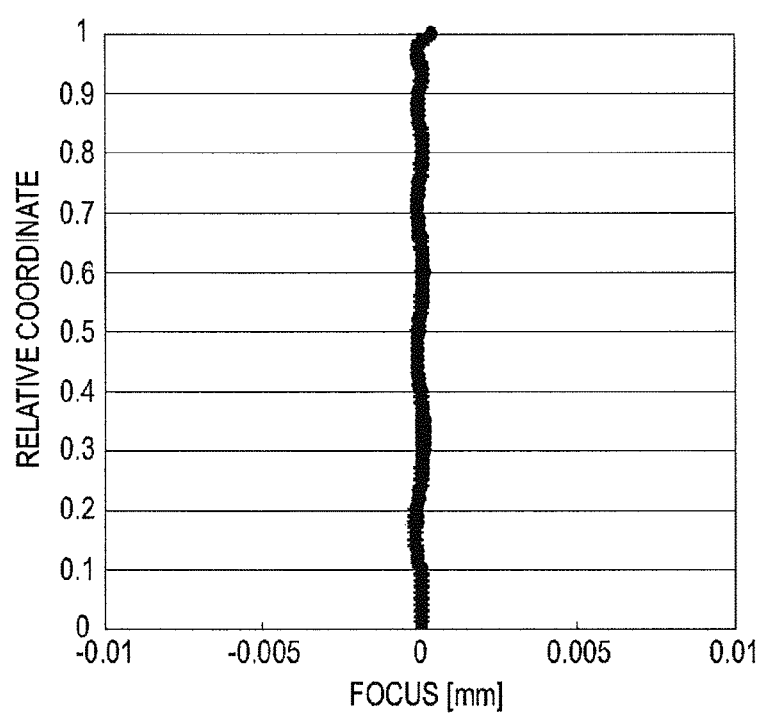
FIG. 20 is a schematic diagram illustrating a longitudinal aberration diagram of an objective lens according to a second numerical example.

The shape of each surface of the objective lens SE2 was formed as an aspheric surface which is represented by applying the respective coefficients (aspheric surface coefficients) of Table 8 to the distance ASP (R) represented in Expression (1). Further, regarding the objective lens SE2, it is possible to obtain the optical characteristics shown in the longitudinal aberration diagram of FIG. 20.

The value of the lens tilt sensitivity LT at 0° C. of the objective lens SE2 was set to be 123.31 mλrms/degree, and was set to be equal to or less than the tolerance of 130 mλrms/degree.

Further, it can be observed that the values calculated by the functions F(x, y, z) and F(x, y, w) are 123.68 and 123.94 mλrms/degree respectively and all the values of the lens tilt sensitivities at 0° C. are appropriately approximated.

This means that, in the optical disc apparatus 10 equipped with the objective lens SE2, it is possible to suppress the lens tilt sensitivity LT at 0° C. to 130 mλrms/degree or less, and thus it is possible to secure the skew margin when the D-skew is made to be equal to or less than 0.10 degrees which is the tolerance shown in the design condition C1 of Table 2.

Further, in the objective lens SE2, the 3rd-order off-axis coma aberration sensitivity x, the 5th-order off-axis coma aberration sensitivity y, and the lens thickness sensitivity z satisfy Expressions (9), (10) and (11), respectively.

As a result, the objective lens SE2 is able to sufficiently minimize the occurrence amount of coma aberration at any temperature in the range of 0 to 70° C. In accordance therewith, the optical disc apparatus 10 equipped with the objective lens SE2 is able to appropriately focus the light beam L onto the optical disc 100 at an intended area even at the low temperature of, for example, 0° C., and is thus able to reliably record and reproduce information.

3-3. Third Numerical Example

In a third numerical example, the objective lens SE3 was designed so that, as shown in the dimensional values of Table 9, the 3rd-order off-axis coma aberration sensitivity x is 24.3 mλrms/degree, the 5th-order off-axis coma aberration sensitivity y is 0.4 mλrms/degree, the lens thickness sensitivity z is −5.5 mλrms/μm, and the light-source-side sag amount w is 1.010 mm.

TABLE 9

DIMENSIONAL VALUES OF THIRD NUMERICAL EXAMPLE

| NUMBER | SE3 | |
|---|---|---|
| FOCAL LENGTH f[mm] | 1.412 | |
| REFRACTIVE INDEX n | 1.560 | |
| TEMPERATURE REFRACTIVE INDEX GRADIENT dn/dT | $-1.09 \times 10^{-4}$ | |
| | LIGHT-SOURCE-SIDE LENS SURFACE | DISC-SIDE LENS SURFACE |
| RDY | 0.95616 | −1.47668 |
| K | −0.65004 | −50.89695 |
| A | 0.03990 | 0.21401 |
| B | −0.06447 | −0.17569 |
| C | 0.36154 | −0.50167 |
| D | −1.10251 | 0.60852 |
| E | 2.09953 | 0.74165 |
| F | −2.43051 | −0.97928 |
| G | 1.67011 | −1.04676 |
| H | −0.62433 | 1.86687 |
| J | 0.09704 | −0.69833 |
| 3RD-ORDER OFF-AXIS COMA ABERRATION SENSITIVITY x[mλrms/degree] | 24.3 | |
| 5TH-ORDER OFF-AXIS COMA ABERRATION SENSITIVITY y[mλrms/degree] | 0.4 | |
| LENS THICKNESS SENSITIVITY z[mλrms/μm] | −5.5 | |
| LIGHT-SOURCE-SIDE SAG AMOUNT w[mm] | 1.010 | |
| LENS TILT SENSITIVITY LT at 0° C. [mλrms/degree] | 112.96 | |
| APPROXIMATION BASED ON F(x, y, z) [mλrms/degree] | 112.67 | |
| APPROXIMATION BASED ON F(x, y, w) [mλrms/degree] | 112.90 | |

Figure 21:
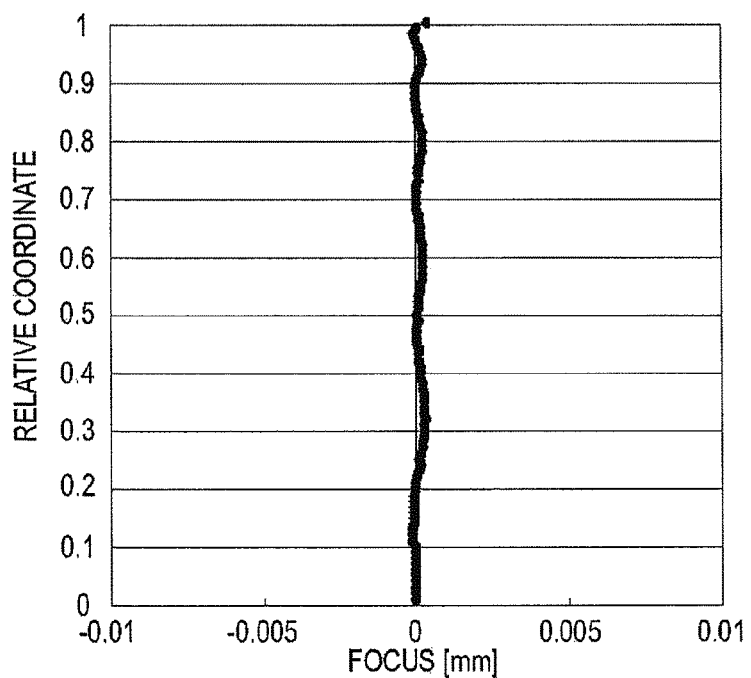
FIG. 21 is a schematic diagram illustrating a longitudinal aberration diagram of an objective lens according to a third numerical example.

The shape of each surface of the objective lens SE3 was formed as an aspheric surface which is represented by applying the respective coefficients (aspheric surface coefficients) of Table 9 to the distance ASP (R) represented in Expression (1). Further, regarding the objective lens SE3, it is possible to obtain the optical characteristics shown in the longitudinal aberration diagram of FIG. 21.

The value of the lens tilt sensitivity LT at 0° C. of the objective lens SE3 was set to be 112.96 mλrms/degree, and was set to be equal to or less than the tolerance of 115 mλrms/degree.

Further, it can be observed that the values calculated by the functions F(x, y, z) and F(x, y, w) are 112.67 and 112.90 mλrms/degree respectively and all the values of the lens tilt sensitivities at 0° C. are appropriately approximated.

This means that, in the optical disc apparatus 10 equipped with the objective lens SE3, it is possible to suppress the lens tilt sensitivity LT at 0° C. to 115 mλrms/degree or less, and thus it is possible to secure the skew margin even when the upper limit tolerance of the D-skew is extended to 0.15 degrees which is the value shown in the design condition C2 of Table 2.

That is, in the objective lens SE3, regardless of the common knowledge in the past, by intentionally setting the 3rd-order off-axis coma aberration sensitivity x to 24.3 mλrms/degree which is far from 0, it is possible to make the lens tilt sensitivity LT at 0° C. equal to or less than 115 mλrms/degree as a small value.

Further, in the objective lens SE3, the 3rd-order off-axis coma aberration sensitivity x, the 5th-order off-axis coma aberration sensitivity y, and the lens thickness sensitivity z satisfy Expressions (9), (10) and (11), respectively.

As a result, the objective lens SE3 is able to sufficiently minimize the occurrence amount of coma aberration at any temperature in the range of 0 to 70° C. In accordance therewith, the optical disc apparatus 10 equipped with the objective lens SE3 is able to appropriately focus the light beam L onto the optical disc 100 at an intended area even at the low temperature of, for example, 0° C., and is thus able to reliably record and reproduce information.

3-4. Fourth Numerical Example

In a fourth numerical example, the objective lens SE4 was designed so that, as shown in the dimensional values of Table 10, the 3rd-order off-axis coma aberration sensitivity x is 18.5 mλrms/degree, the 5th-order off-axis coma aberration sensitivity y is 0.4 mλrms/degree, the lens thickness sensitivity z is −19.0 mλrms/μm, and the light-source-side sag amount w is 0.922 mm.

TABLE 10

DIMENSIONAL VALUES OF FOURTH NUMERICAL EXAMPLE

| NUMBER | SE4 | |
|---|---|---|
| FOCAL LENGTH f[mm] | 1.412 | |
| REFRACTIVE INDEX n | 1.560 | |
| TEMPERATURE REFRACTIVE INDEX GRADIENT dn/dT | $-1.09 \times 10^{-4}$ | |
| | LIGHT-SOURCE-SIDE LENS SURFACE | DISC-SIDE LENS SURFACE |
| RDY | 0.986259 | −1.371780 |
| K | −0.825902 | −53.241987 |
| A | 0.081819 | 0.097071 |
| B | −0.108759 | −0.033591 |
| C | 0.418147 | −0.614176 |
| D | −1.129691 | 0.644166 |
| E | 2.099527 | 0.741653 |
| F | −2.430514 | −0.979282 |
| G | 1.670105 | −1.046755 |
| H | −0.624328 | 1.866865 |
| J | 0.097039 | −0.698326 |
| 3RD-ORDER OFF-AXIS COMA ABERRATION SENSITIVITY x[mλrms/degree] | 18.5 | |
| 5TH-ORDER OFF-AXIS COMA ABERRATION SENSITIVITY y[mλrms/degree] | −0.4 | |
| LENS THICKNESS SENSITIVITY z[mλrms/μm] | −19.0 | |
| LIGHT-SOURCE-SIDE SAG AMOUNT w[mm] | 0.922 | |
| LENS TILT SENSITIVITY LT at 0° C. [mλrms/degree] | 115.10 | |
| APPROXIMATION BASED ON F(x, y, z) [mλrms/degree] | 105.20 | |
| APPROXIMATION BASED ON F(x, y, w) [mλrms/degree] | 106.30 | |

Figure 22:
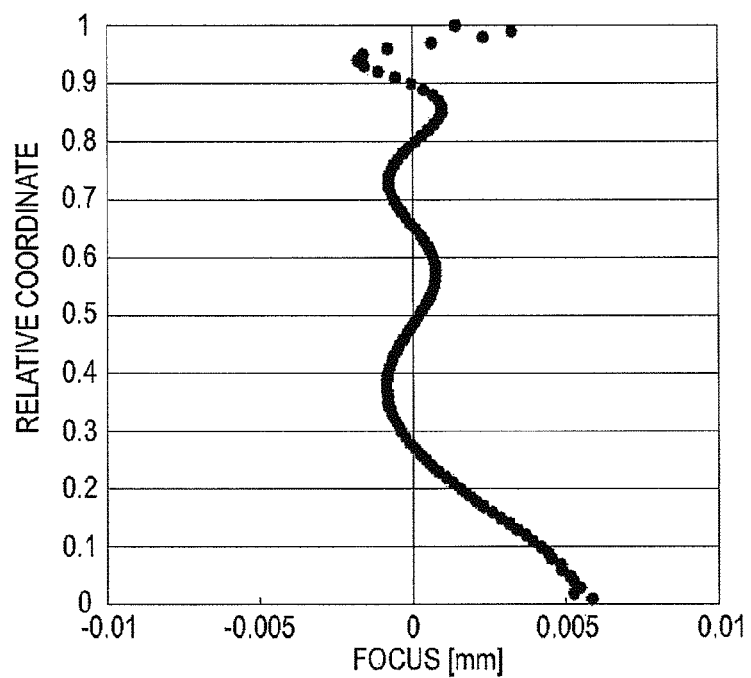
FIG. 22 is a schematic diagram illustrating a longitudinal aberration diagram of an objective lens according to a fourth numerical example.

The shape of each surface of the objective lens SE4 was formed as an aspheric surface which is represented by applying the respective coefficients (aspheric surface coefficients)

of Table 10 to the distance ASP (R) represented in Expression (1). Further, regarding the objective lens SE4, it is possible to obtain the optical characteristics shown in the longitudinal aberration diagram of FIG. 22.

The value of the lens tilt sensitivity LT at 0° C. of the objective lens SE4 was set to be 115.10 mλrms/degree, and was set to be equal to or less than the tolerance of 130 mλrms/degree and to be close to the tolerance of 115 mλrms/degree.

Further, as can be seen from the above, the values calculated by the functions F(x, y, z) and F(x, y, w) are 105.20 and 106.30 mλrms/degree respectively, and although there is a small degree of error, the values of the lens tilt sensitivities at 0° C. are relatively appropriately approximated.

This means that, in the optical disc apparatus 10 equipped with the objective lens SE4, it is possible to suppress the lens tilt sensitivity LT at 0° C. to 130 mλrms/degree or less, and thus it is possible to secure the skew margin when the D-skew is made to be equal to or less than 0.10 degrees which is the tolerance shown in the design condition C1 of Table 2.

That is, in the objective lens SE4, by setting the 3rd-order off-axis coma aberration sensitivity x to 18.5 mλrms/degree which is far from 0 and also setting the lens thickness sensitivity z to −19.0 mλrms/μm which is far from 0, it is possible to make the lens tilt sensitivity LT at 0° C. close to 115 mλrms/degree as a small value.

Further, in the objective lens SE4, the 3rd-order off-axis coma aberration sensitivity x, the 5th-order off-axis coma aberration sensitivity y, and the lens thickness sensitivity z satisfy Expressions (9), (10) and (11), respectively.

As a result, the objective lens SE4 is able to sufficiently minimize the occurrence amount of coma aberration at any temperature in the range of 0 to 70° C. In accordance therewith, the optical disc apparatus 10 equipped with the objective lens SE4 is able to appropriately focus the light beam L onto the optical disc 100 at an intended area even at the low temperature of, for example, 0° C., and is thus able to reliably record and reproduce information.

3-5. Fifth Numerical Example

In a fifth numerical example, the objective lens SE5 was designed so that, as shown in the dimensional values of Table 11, the 3rd-order off-axis coma aberration sensitivity x is 1.5 mλrms/degree, the 5th-order off-axis coma aberration sensitivity y is 6.9 mλrms/degree, the lens thickness sensitivity z is −18.8 mλrms/μm, and the light-source-side sag amount w is 0.917 mm.

TABLE 11

DIMENSIONAL VALUES OF FIFTH NUMERICAL EXAMPLE

| NUMBER | | SE5 |
|---|---|---|
| FOCAL LENGTH f[mm] | | 1.412 |
| REFRACTIVE INDEX n | | 1.560 |
| TEMPERATURE REFRACTIVE INDEX GRADIENT dn/dT | | $-1.09 \times 10^{-4}$ |
| | LIGHT-SOURCE-SIDE LENS SURFACE | DISC-SIDE LENS SURFACE |
| RDY | 0.990377 | −1.359643 |
| K | −0.832479 | −51.978816 |
| A | 0.081078 | 0.091954 |
| B | −0.106022 | −0.014419 |
| C | 0.414383 | −0.639728 |
| D | −1.128323 | 0.655177 |
| E | 2.099527 | 0.741653 |
| F | −2.430514 | −0.979282 |
| G | 1.670105 | −1.046755 |
| H | −0.624328 | 1.866865 |
| J | 0.097039 | −0.698326 |
| 3RD-ORDER OFF-AXIS COMA ABERRATION SENSITIVITY x[mλrms/degree] | | 1.5 |
| 5TH-ORDER OFF-AXIS COMA ABERRATION SENSITIVITY y[mλrms/degree] | | 6.9 |
| LENS THICKNESS SENSITIVITY z[mλrms/μm] | | −18.8 |
| LIGHT-SOURCE-SIDE SAG AMOUNT w[mm] | | 0.917 |
| LENS TILT SENSITIVITY LT at 0° C. [mλrms/degree] | | 127.34 |
| APPROXIMATION BASED ON F(x, y, z) [mλrms/degree] | | 121.20 |
| APPROXIMATION BASED ON F(x, y, w) [mλrms/degree] | | 122.41 |

Figure 23:
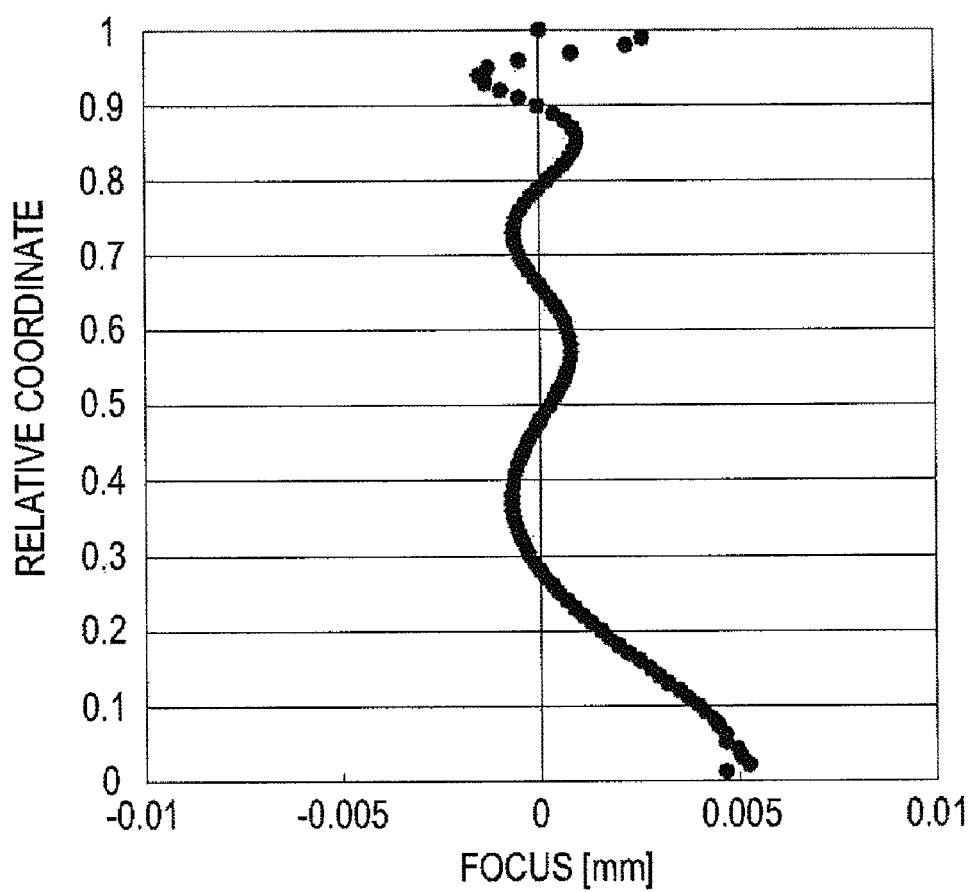
FIG. 23 is a schematic diagram illustrating a longitudinal aberration diagram of an objective lens according to a fifth numerical example.

The shape of each surface of the objective lens SE5 was formed as an aspheric surface which is represented by applying the respective coefficients (aspheric surface coefficients) of Table 11 to the distance ASP (R) represented in Expression (1). Further, regarding the objective lens SE5, it is possible to obtain the optical characteristics shown in the longitudinal aberration diagram of FIG. 23.

The value of the lens tilt sensitivity LT at 0° C. of the objective lens SE5 was set to be 127.34 mλrms/degree, and was set to be equal to or less than the tolerance of 130 mλrms/degree.

Further, as can be seen from the above, the values calculated by the functions F(x, y, z) and F(x, y, w) are 121.20 and 122.41 mλrms/degree respectively, and although there is a small degree of error, the values of the lens tilt sensitivities at 0° C. are relatively appropriately approximated to be equal to or less than the tolerance of 130 mλrms/degree.

This means that, in the optical disc apparatus 10 equipped with the objective lens SE5, it is possible to suppress the lens tilt sensitivity LT at 0° C. substantially to around 130 mλrms/degree, and thus it is possible to secure the skew margin when the D-skew is actually made to be equal to or less than 0.10 degrees which is the tolerance shown in the design condition C1 of Table 2.

That is, in the objective lens SE5, by intentionally setting the lens thickness sensitivity z to −18.8 mλrms/degree which is far from 0, it is possible to make the lens tilt sensitivity LT at 0° C. equal to or less than 130 mλrms/degree as a small value.

Further, in the objective lens SE5, the 3rd-order off-axis coma aberration sensitivity x, the 5th-order off-axis coma aberration sensitivity y, and the lens thickness sensitivity z satisfy Expressions (9), (10) and (11), respectively.

As a result, the objective lens SE5 is able to sufficiently minimize the occurrence amount of coma aberration at any temperature in the range of 0 to 70° C. In accordance therewith, the optical disc apparatus 10 equipped with the objective lens SE5 is able to appropriately focus the light beam L onto the optical disc 100 at an intended area even at the low temperature of, for example, 0° C., and is thus able to reliably record and reproduce information.

4. Operations and Advantages

In the objective lens 18 mounted in the optical pickup 17 of the optical disc apparatus 10 with the above-mentioned configuration, the lens tilt sensitivity LT at 0° C. was approximated to the function F(x, y, z) based on the 3rd-order off-axis coma aberration sensitivity x, the 5th-order off-axis coma aberration sensitivity y, and the lens thickness sensitivity z at 35° C.

Further, the objective lens 18 was designed so that the 3rd-order off-axis coma aberration sensitivity x, the 5th-order off-axis coma aberration sensitivity y, and the lens thickness sensitivity z at 35° C. is made to be equal to or less than the tolerance of 130 mλrms/degree when substituted for the function F(x, y, z).

Thereby, in the optical disc apparatus 10 equipped with the objective lens 18, it is possible to make the lens tilt sensitivity LT at 0° C. equal to or less than 130 mλrms/degree. Thus, it is possible to secure the skew margin at the low temperature of 0° C. when the D-skew is made to be equal to or less than 0.10 degrees which is the tolerance shown in the design condition C1 of Table 3.

That is, in the optical disc apparatus 10, since the total skew margin in terms of the disc tilt conversion can be suppressed to be equal to or less than the tolerance of 0.75 degrees, it is possible to minimize greatly the occurrence amount of coma aberration within the operable temperature range. As a result, the optical disc apparatus 10 is able to prevent the accuracy of recording and reproducing for the optical disc 100 from deteriorating.

In particular, the function F(x, y, z) representing the lens tilt sensitivity LT at 0° C. was approximated, as represented by Expression (5), to the sum of the respective 1st-order terms of the 3rd-order off-axis coma aberration sensitivity x, the 5th-order off-axis coma aberration sensitivity y, and the lens thickness sensitivity z at 35° C. Hence, in the design of the objective lens 18, when the lens tilt sensitivity LT is suppressed to be equal to or less than the desired tolerance (for example 130 mλrms/degree), the values of the 3rd-order off-axis coma aberration sensitivity x, the 5th-order off-axis coma aberration sensitivity y, and the lens thickness sensitivity z can be treated as variables independent from each other.

The optical pickup 17 of the optical disc apparatus 10 has the premise that the method of securing the tilt angle of the objective lens 18 on the basis of the accuracy thereof without adjusting the tilt angle thereof is adopted. In this case, there is a demand to minimize greatly the tilt sensitivity. In the case of the objective lens 18 made of the resin material, considering that, at the low temperature of for example 0° C., the lens tilt sensitivity LT increases more compared with the normal temperature of for example 35° C., the design thereof was made so that the lens tilt sensitivity at 0° C. is suppressed to be equal to or less than the tolerance of 130 mλrms/degree.

As it is, attention had not hitherto been focused on the lens tilt sensitivity LT at the low temperature of for example 0° C., and even when the value thereof is intended to be suppressed to 130 mλrms/degree or less, the method of suppressing the value had not been established.

For this reason, in the objective lens 18, attention was focused on the parameters which are frequently used in the design of the objective lens and which include the 3rd-order off-axis coma aberration sensitivity x, the 5th-order off-axis coma aberration sensitivity y, and the lens thickness sensitivity z at 35° C. In addition, as represented in Expression (5), the establishment of the substantially linear relationship between the parameters and the lens tilt sensitivity LT at 0° C. was clarified, and then the ranges of the parameters were respectively and appropriately defined as represented in Expressions (9) to (11).

Further, Expression (5) is an approximation, as shown in FIGS. 13 to 16, Tables 7 to 11, and the like, and the value of the lens tilt sensitivity LT at 0° C. is approximated with a sufficient accuracy.

Until now, from the viewpoint of suppressing coma aberration and spherical aberration, it had been hitherto considered that it is preferable to make each of the parameters such as the 3rd-order off-axis coma aberration sensitivity x, the 5th-order off-axis coma aberration sensitivity y, and the lens thickness sensitivity z at 35° C., independently close to zero.

However, in the objective lens 18 according to the embodiment of the invention, as shown in the first to fifth numerical examples, the lens tilt sensitivity LT at 0° C. can be suppressed to be equal to or less than the tolerance thereof by designing to intentionally set the parameters to values other than zero, that is, values satisfying Expression (6), (7), or (8).

Furthermore, in the objective lens 18, as represented in Expression (15), the lens thickness sensitivity z was approximated by the function G(x, y, w) based on the 3rd-order off-axis coma aberration sensitivity x, the 5th-order off-axis coma aberration sensitivity y, and the light-source-side sag amount w. On the basis of this, the lens tilt sensitivity LT of the objective lens 18 at 0° C. was expressed by the function F(x, y, w) represented in Expression (16) by using the light-source-side sag amount w.

Thereby, in the objective lens 18, even when the light-source-side sag amount w is used instead of the lens thickness sensitivity z, it is possible to easily calculate the lens tilt sensitivity LT.

In addition, in the optical disc apparatus 10, as shown in the design condition C2 or C3 of Tables 2 and 3, the objective lens 18 is designed to make the function F(x, y, z) equal to or less than 115 or 100 mλrms/degree, and thereby it is possible to relax the tolerance of the D-skew up to 0.15 or 0.20 degrees while minimizing the occurrence amount of coma aberration.

In such a manner, although the optical pickup 17, of which the D-skew is within the range of 0.10 to 0.15 or 0.20 degrees, and the optical disc apparatus 10 using the same are regarded as defective products under the design condition C1, those can be treated as non-defective products satisfying the skew margin defined in the BD format. Thus, it is possible to improve the yield thereof.

Further, in the optical disc apparatus 10, the objective lens 18 is designed so as to make the 3rd-order off-axis coma aberration sensitivity x, the 5th-order off-axis coma aberration sensitivity y, and the lens thickness sensitivity z respectively fall within the ranges of Expressions (9), (10), and (11). Thereby, the occurrence amount of coma aberration can be remarkably minimized to be within a problem-free range, and thus does not have a great effect on various measurements at the time of manufacture thereof.

Furthermore, in the optical disc apparatus 10, the objective lens 18 is designed so as to make the 3rd-order off-axis coma aberration sensitivity x, the 5th-order off-axis coma aberration sensitivity y, and the lens thickness sensitivity z respectively fall within the ranges of Expressions (12), (13), and (14). Thereby, the occurrence amounts of coma aberration and the like can be further minimized.

With such a configuration, the objective lens 18 mounted in the optical pickup 17 of the optical disc apparatus 10 was designed so as to make the function F(x, y, z) equal to or less than the tolerance of 130 mλrms/degree. Here, the function is obtained by approximating the lens tilt sensitivity LT at 0° C. through the 3rd-order off-axis coma aberration sensitivity x, the 5th-order off-axis coma aberration sensitivity y, and the lens thickness sensitivity z at 35° C. Thereby, in the optical disc apparatus 10 equipped with the objective lens 18, it is possible to make the lens tilt sensitivity LT at 0° C. equal to or less than 130 mλrms/degree. As a result, even when the D-skew is 0.10 degrees which is the tolerance shown in the design condition C1 of Table 2, it is possible to secure the skew margin.

5. Other Embodiments

Further, the above-mentioned embodiment described the case where the objective lens 18 is designed by selecting the 3rd-order off-axis coma aberration sensitivity x, the 5th-order off-axis coma aberration sensitivity y, and the lens thickness sensitivity z which make the lens tilt sensitivity LT equal to or less than 130, 115, or 100 mλrms/degree.

However, the invention is not limited to this. For example, the objective lens 18 may be designed by selecting the 3rd-order off-axis coma aberration sensitivity x, the 5th-order off-axis coma aberration sensitivity y, and the lens thickness sensitivity z which make the lens tilt sensitivity LT at the low temperature of 0° C. equal to or less than other various tolerances. In this case, in accordance with the lens tilt sensitivity LT, the tolerance of the D-skew can be appropriately relaxed. Therefore, it is possible to further improve the yields of the optical pickup 17 equipped with the objective lens 18 and the optical disc apparatus 10 equipped with the optical pickup.

That is, the tolerance of the lens tilt sensitivity LT may be set to satisfy the following condition: when the tolerance (each value of the D-skew of Table 2) of the D-skew represented as the tilt angle of the objective lens 18 is converted into the tolerance (each value of the D-skew factors of Table 3) of the D-skew represented as the tilt angle of the optical disc 100 by using the value of the lens tilt sensitivity, the total of the converted value and the skews caused by other various skew occurrence factors is equal to or less than the skew margin of 0.75 degrees.

Further, the above-mentioned embodiment described the case where, when the tolerance of the D-skew is set to 0.10 degrees in accordance with the standard of the BD format, the lens tilt sensitivity is set so as to make the sum of the skews caused by various factors equal to or less than 0.75 degrees which is the tolerance of the skew margin.

However, the invention is not limited to this. For example, the tolerance of the D-skew may be relaxed from 0.10 degrees. In this case, the lens tilt sensitivity may be set again so as to make the sum of the skews caused by various factors equal to or less than 0.75 degrees which is the tolerance of the skew margin.

Figure 1:
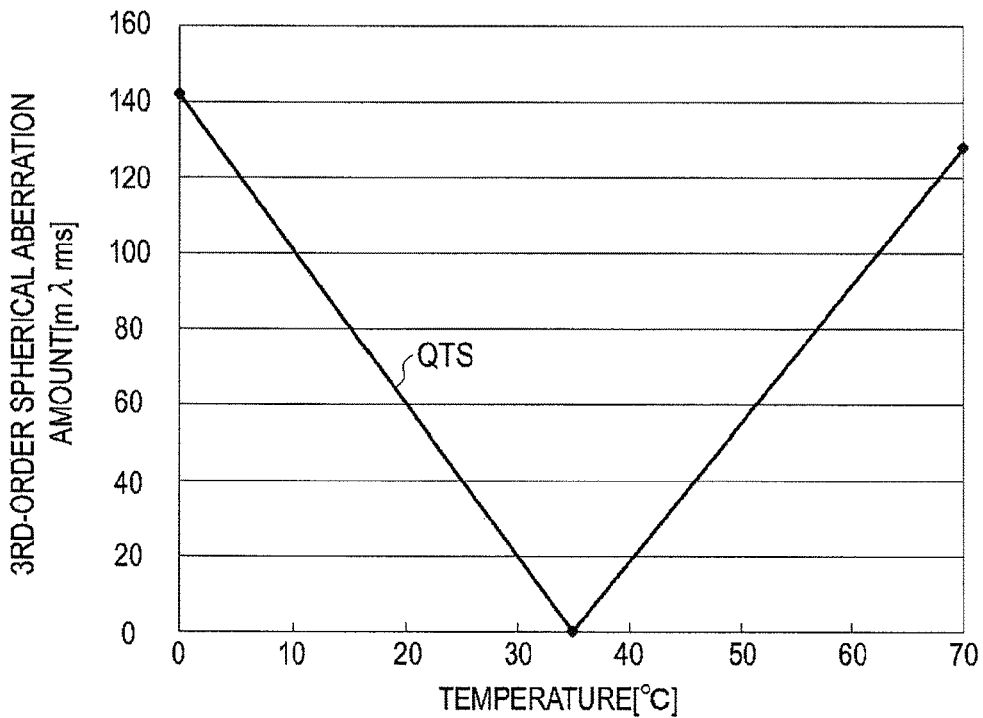
FIG. 1 is a schematic diagram illustrating a relationship between a 3rd-order spherical aberration amount and a temperature of an objective lens.
Figure 2:
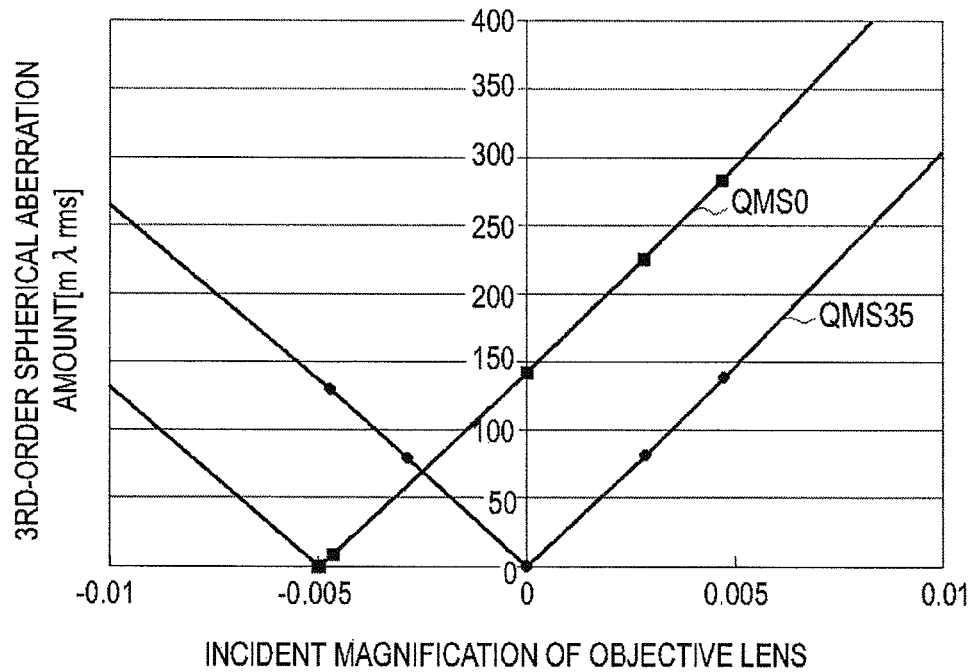
FIG. 2 is a schematic diagram illustrating a relationship between the 3rd-order spherical aberration amount and an incident magnification of the objective lens.
Figure 3:
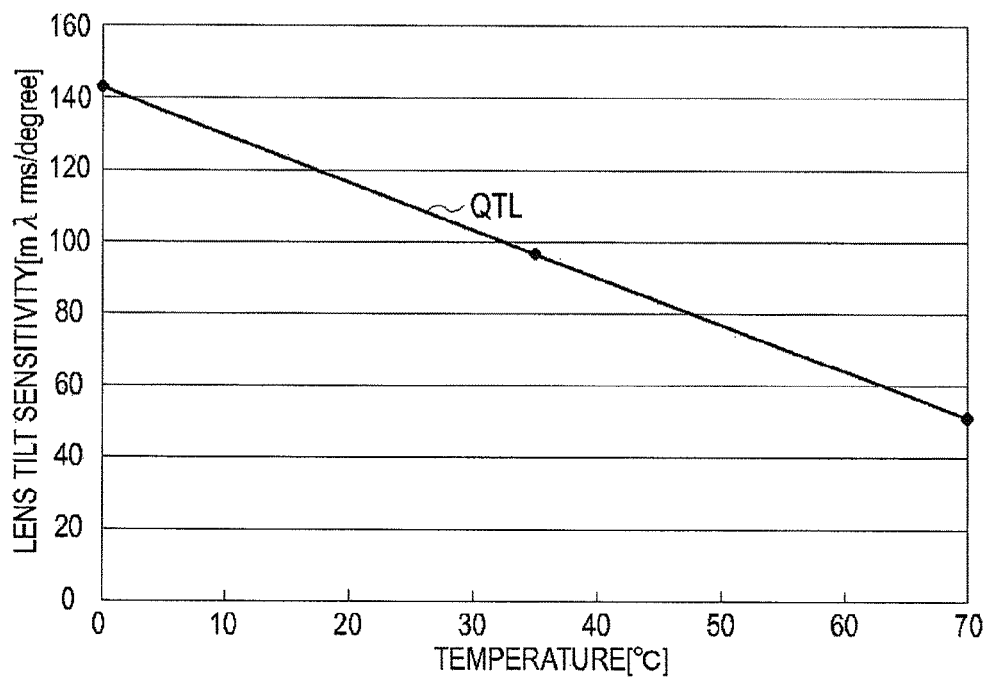
FIG. 3 is a schematic diagram illustrating a relationship between a lens tilt sensitivity and the temperature of an objective lens.
Figure 4:
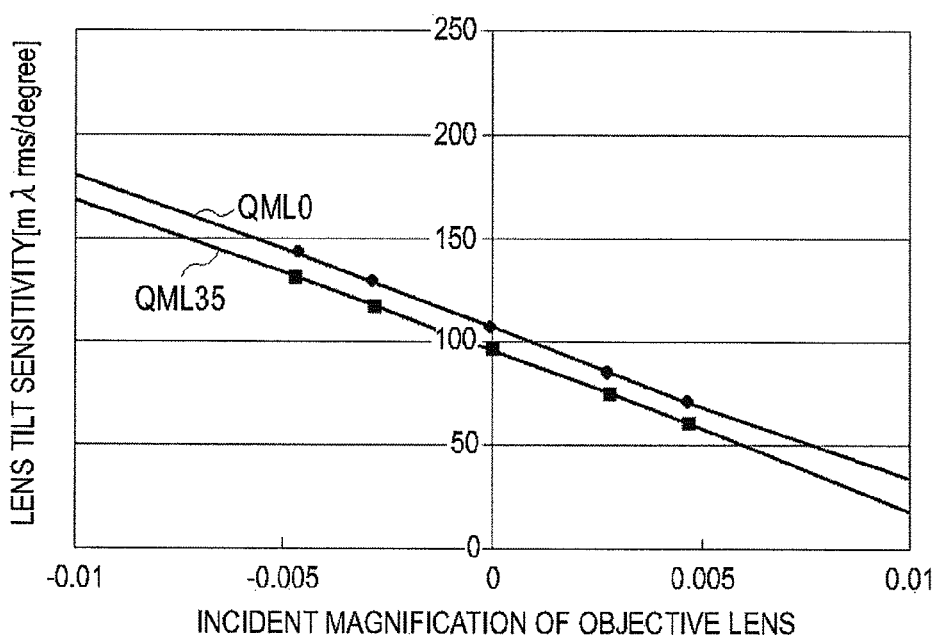
FIG. 4 is a schematic diagram illustrating a relationship between the lens tilt sensitivity and the incident magnification of the objective lens.
Figure 5:
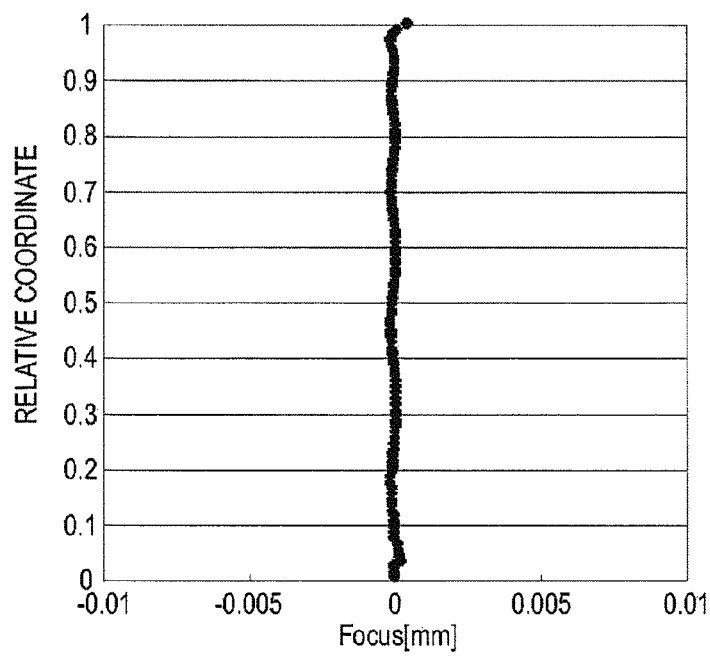
FIG. 5 is a schematic diagram illustrating a longitudinal aberration diagram of a typical objective lens.

Furthermore, the above-mentioned embodiment described the case of setting the tolerance of the lens tilt sensitivity LT at 0° C. as the value of the lens tilt sensitivity LT within the range of 0 to 70° C. as the operable temperature range of the optical disc apparatus 10 reaches a maximum at 0° C. (FIG. 3).

However, the invention is not limited to this. For example, the tolerance of the lens tilt sensitivity LT may be set to correspond to various temperatures at which the value of the lens tilt sensitivity LT within the operable temperature range of the optical disc apparatus 10 is maximized.

In addition, the above-mentioned embodiment described the case where it is assumed that the operation guarantee temperature range of the objective lens 18 mounted in the optical disc apparatus 10 is 0 to 70° C.

However, the invention is not limited to this. For example, another corresponding operation guarantee temperature range may be assumed in accordance with the condition for use of the optical disc apparatus 10. For example, when the optical disc apparatus 10 is restricted to be used indoors, the range of 5 to 70° C. may be assumed as the operation guarantee temperature range of the objective lens 18. In this case, it is preferable that the lens tilt sensitivity LT at 5° C., which is the lowest temperature in the operation guarantee temperature range, is equal to or less than 130 mλrms/degree.

Further, the above-mentioned embodiment described the case where the linear relation of the function F(x, y, z) of Expression (5) is obtained on the basis of the 3rd-order off-axis coma aberration sensitivity x, the 5th-order off-axis coma aberration sensitivity y, and the lens thickness sensitivity z at 35° C. as the parameters.

However, the invention is not limited to this. For example, the F(x, y, z) may be obtained on the basis of the 3rd-order off-axis coma aberration sensitivity, 5th-order off-axis coma aberration sensitivity and lens thickness sensitivity at an optional temperature of for example 25° C. or the like. Even in this case, the linear relation like Expression (5) is established.

Furthermore, the above-mentioned embodiment and the first to fifth numerical examples described the case where the objective lens 18 is made of the resin material of which the refractive index n is 1.560 in the case of light with the wavelength λ of 405 nm.

However, the invention is not limited to this. For example, the objective lens 18 may be made of the optional component material of which the refractive index n is optional in the case of light with an optional wavelength λ. In this case, it is preferable to appropriately change the coefficients of Expression (5) by using a simulation and the like according to the value of the refractive index n. Further, it is possible to make the wavelength λ compatible with the optical disc 100 of the BD format by setting the wavelength to at least 410 nm or less. Furthermore, it is inferred that, when the refractive index n is set to at least 1.50 or more and 1.60 or less, the respective coefficients of Expression (5) can be determined by the above-mentioned method.

Further, the above-mentioned embodiment and the first to fifth numerical examples described the case where the focal length f is set to 1.412 mm.

However, the invention is not limited to this, and the focal length f may be set to an optional value. It is inferred that, when the focal length f is at least 3 mm or less, the respective coefficients of Expression (5) can be determined by the above-mentioned method.

Furthermore, the above-mentioned first to fifth numerical examples described the case where the temperature refractive index gradient dn/dT of the component material of each objective lens is set to $-1.09 \times 10^{-4}$.

However, the invention is not limited to this, and the temperature refractive index gradient dn/dT of the component material of the objective lens may be set to $-1.3 \times 10^{-4}$ or more and $-1.0 \times 10^{-4}$ or less.

Further, the above-mentioned embodiment described the case of correcting the 3rd-order spherical aberration which is caused when the light beam L is focused onto the optical disc 100 by moving the collimator lens 24.

However, the invention is not limited to this. For example, after a temperature sensor is provided, in accordance with the temperature of the inside of the optical pickup 17 or on the basis of the light receiving result of the reflection light beam L2, the driving control section 13 may control the actuator 25. Alternatively, when it is detected that the 3rd-order spherical aberration is relatively small, the collimator lens 24 may be fixed.

Furthermore, the above-mentioned embodiment described the case where the embodiment of the invention is applied to the optical disc apparatus 10 which records the information on the optical disc 100 and reproduces the information from the corresponding optical disc 100. However, the invention is not limited to this, and for example, may be applied to an optical disc reproducing apparatus that reproduces information from the optical disc 100.

In addition, the above-mentioned embodiment described the case where the optical disc apparatus 10 as an optical disc apparatus includes: the laser diode 21 as the light source; the collimator lens 24 as the collimator lens; the actuator 15 as the actuator; the objective lens 18 as the objective lens; and the driving control section 13 as the driving control section.

However, the invention is not limited to this, and the optical disc apparatus may include: a light source; a collimator lens; an actuator; an objective lens; and a driving control section which are formed by various other configuration.

The embodiments of the invention can be applied to optical disc apparatuses that records information such as video, audio, or various data on various optical discs and reproduces the corresponding information from the corresponding optical disc.

The present application contains subject matter related to that disclosed in Japanese Priority Patent Application JP 2009-256316 filed in the Japan Patent Office on Nov. 9, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An objective lens comprising a resin material to focus incident rays, which have a wavelength of 410 nm or less and are emitted from a light source, on an optical disc at a numerical aperture of 0.8 or more,
wherein when a lens tilt sensitivity is defined as an amount of a 3rd-order coma aberration caused per a lens tilt of 1 degree, the lens tilt being an angle formed between an optical axis of the objective lens and a system optical axis of an optical system including the objective lens at 0° C., the lens tilt sensitivity is 130 m$\lambda$rms/degree or less, and
wherein a refractive index n of the resin material satisfies $1.50 \leq n \leq 1.60$ at a wavelength of 405 nm, and a refractive index gradient dn/dT of the resin material relative to a temperature thereof satisfies $-1.3 \times 10^{-4} \leq dn/dT \leq -1.0 \times 10^{-4}$.

2. The objective lens according to claim 1, wherein
a focal length f of the objective lens is 1.412 mm,
the refractive index n of the resin material is 1.560,
the refractive index gradient dn/dT of the resin material relative to the temperature thereof is $-1.09 \times 10^{-4}$, and,
assuming that 3rd-order and 5th-order coma aberrations caused when the optical axis of the rays incident to the objective lens is tilted by 1 degree with respect to the system optical axis at 35° C. are respectively a 3rd-order off-axis coma aberration sensitivity x [m$\lambda$rms/degree] and a 5th-order off-axis coma aberration sensitivity y [m$\lambda$rms/degree], and an amount of a 3rd-order spherical aberration caused when a lens thickness as a space between lens centers of both surfaces of the objective lens increases by 1 μm from a designed value is a lens thickness sensitivity z [m$\lambda$rms/μm], the 3rd-order off-axis coma aberration sensitivity x, the 5th-order off-axis coma aberration sensitivity y, and the lens thickness sensitivity z are respectively determined so that a function F(x, y, z) represented by the following Expression (1) is equal to 130 or less $$F(x,y,z) = -1.05x - 0.27y + 1.03z + 144.00 \quad (1).$$

3. The objective lens according to claim 2, wherein the 3rd-order off-axis coma aberration sensitivity x satisfies $-25.00 \leq x \leq +25.00$, the 5th-order off-axis coma aberration sensitivity y satisfies $-25.00 \leq y \leq +25.00$, and the lens thickness sensitivity z satisfies $-25.00 \leq z \leq +25.00$.

4. The objective lens according to claim 1, wherein
a focal length f of the objective lens is 1.412 mm,
the refractive index n of the resin material is 1.560,
the refractive index gradient dn/dT of the resin material relative to the temperature thereof is $-1.09 \times 10^{-4}$, and,
assuming that 3rd-order and 5th-order coma aberrations caused when the optical axis of the rays incident to the objective lens is tilted by 1 degree with respect to the system optical axis at 35° C. are respectively a 3rd-order off-axis coma aberration sensitivity x [m$\lambda$rms/degree] and a 5th-order off-axis coma aberration sensitivity y [m$\lambda$rms/degree], and a length in an optical axis direction from a tangent plane, which passes through a surface vertex of a light-source-side optical surface of the objective lens, to a point located on the light-source-side optical surface at a radius of 1.20 mm from the corresponding surface vertex of the light-source-side optical surface, is a light-source-side sag amount w [mm], the 3rd-order off-axis coma aberration sensitivity x, the 5th-order off-axis coma aberration sensitivity y, and the light-source-side sag amount w are respectively determined to make a function F(x, y, w), which is represented by the following Expression (2), equal to 130 or less $$F(x,y,w) = -1.10x - 0.20y + 150.13w - 11.94 \quad (2).$$

5. The objective lens according to claim 4, wherein the 3rd-order off-axis coma aberration sensitivity x satisfies $-25.00 \leq x \leq +25.00$, the 5th-order off-axis coma aberration sensitivity y satisfies $-25.00 \leq y \leq +25.00$, and the light-source-side sag amount w satisfies $0.85 \leq w \leq 1.23$.

6. The objective lens according to claim 1, wherein the lens tilt sensitivity at 0° C. is 115 m$\lambda$rms/degree or less.

7. The objective lens according to claim 6, wherein a refractive index n of the resin material satisfies $1.50 \leq n \leq 1.60$ at a wavelength of 405 nm, and a refractive index gradient dn/dT of the resin material relative to a temperature thereof satisfies $-1.3 \times 10^{-4} \leq dn/dT \leq -1.0 \times 10^{-4}$.

8. The objective lens according to claim 7, wherein
a focal length f of the objective lens is 1.412 mm,
the refractive index n of the resin material is 1.560,
the refractive index gradient dn/dT of the resin material relative to the temperature thereof is $-1.09 \times 10^{-4}$, and,
assuming that 3rd-order and 5th-order coma aberrations caused when the optical axis of the rays incident to the objective lens is tilted by 1 degree with respect to the system optical axis at 35° C. are respectively a 3rd-order off-axis coma aberration sensitivity x [m$\lambda$rms/degree] and a 5th-order off-axis coma aberration sensitivity y [m$\lambda$rms/degree], and an amount of a 3rd-order spherical aberration caused when a lens thickness as a space between lens centers of both surfaces of the objective lens increases by 1 μm from a designed value is a lens thickness sensitivity z [m$\lambda$rms/μm], the 3rd-order off-axis coma aberration sensitivity x, the 5th-order off-axis coma aberration sensitivity y, and the lens thickness sensitivity z are respectively determined to make a function F(x, y, z), which is represented by the following Expression (3), equal to 115 or less $$F(x,y,z)=-1.05x-0.27y+1.03z+144.00 \quad (3).$$

9. The objective lens according to claim 8, wherein the 3rd-order off-axis coma aberration sensitivity x satisfies $-25.00 \leq x \leq +25.00$, the 5th-order off-axis coma aberration sensitivity y satisfies $-25.00 \leq y \leq +25.00$, and the lens thickness sensitivity z satisfies $-25.00 \leq z \leq +25.00$.

10. The objective lens according to claim 7, wherein
a focal length f of the objective lens is 1.412 mm,
the refractive index n of the resin material is 1.560,
the refractive index gradient dn/dT of the resin material relative to the temperature thereof is $-1.09 \times 10^{-4}$, and
the lens tilt sensitivity is expressed such that, assuming that 3rd-order and 5th-order coma aberrations caused when the optical axis of the rays incident to the objective lens is tilted by 1 degree with respect to the system optical axis at 35° C. are respectively a 3rd-order off-axis coma aberration sensitivity x [mλrms/degree] and a 5th-order off-axis coma aberration sensitivity y [mλrms/degree], and a length in an optical axis direction from a tangent plane, which passes through a surface vertex of a light-source-side optical surface of the objective lens, to a point located on the light-source-side optical surface at a radius of 1.20 mm from the corresponding surface vertex of the light-source-side optical surface, is a light-source-side sag amount w [mm],
the 3rd-order off-axis coma aberration sensitivity x, the 5th-order off-axis coma aberration sensitivity y, and the light-source-side sag amount w are respectively determined to make a function F(x, y, w), which is represented by the following Expression (4), equal to 115 or less $$F(x,y,w)=-1.10x-0.20y+150.13w-11.94 \quad (4).$$

11. The objective lens according to claim 10, wherein the 3rd-order off-axis coma aberration sensitivity x satisfies $-25.00 \leq x \leq +25.00$, the 5th-order off-axis coma aberration sensitivity y satisfies $-25.00 \leq y \leq +25.00$, and the light-source-side sag amount w satisfies $0.85 \leq w \leq 1.23$.

12. An optical pickup comprising:
a light source to emit rays with a wavelength of 410 nm or less;
an objective lens that is made of a resin material to focus the rays on an optical disc at a numerical aperture of 0.8 or more,
wherein when a lens tilt sensitivity is defined as an amount of a 3rd-order coma aberration caused per a lens tilt of 1 degree, the lens tilt being an angle formed between an optical axis of the objective lens and a system optical axis of an optical system including the objective lens at 0° C., the lens tilt sensitivity is 130 mλrms/degree or less, and
wherein a refractive index n of the resin material satisfies $1.50 \leq n \leq 1.60$ at a wavelength of 405 nm, and a refractive index gradient dn/dT of the resin material relative to a temperature thereof satisfies $-1.3 \times 10^{-4} \leq dn/dT \leq -1.0 \times 10^{-4}$.

13. The optical pickup according to claim 12, further comprising:
a collimator lens to converge or diverge the rays emitted from the light source so as to make the rays incident to the objective lens; and
a collimator lens moving section to move the collimator lens in a direction along the system optical axis so as to change an incident magnification of the rays incident to the objective lens.

14. An optical disc apparatus comprising:
a light source to emit rays with a wavelength of 410 nm or less;
a collimator lens to converge or diverge the rays;
an objective lens that is made of a resin material to focus the rays, which are incident through the collimator lens, on an optical disc at a numerical aperture of 0.8 or more, in which when a lens tilt sensitivity is defined as an amount of a 3rd-order coma aberration caused per a lens tilt of 1 degree, the lens tilt being an angle formed between an optical axis of the objective lens and a system optical axis of an optical system including the objective lens at 0° C., the lens tilt sensitivity is 130 mλrms/degree or less;
a collimator lens moving section to move the collimator lens in a direction along the system optical axis so as to change an incident magnification of the rays incident to the objective lens;
a control section to correct spherical aberration by moving the collimator lens; and
wherein a refractive index n of the resin material satisfies $1.50 \leq n \leq 1.60$ at a wavelength of 405 nm, and a refractive index gradient dn/dT of the resin material relative to a temperature thereof satisfies $-1.3 \times 10^{-4} \leq dn/dT \leq -1.0 \times 10^{-4}$.

* * * * *